(12) United States Patent
Terwiesch et al.

(10) Patent No.: US 9,172,221 B2
(45) Date of Patent: Oct. 27, 2015

(54) CONVERTER BUILDING

(71) Applicants: Peter Terwiesch, Mannheim (DE); Navid Mahdizadeh, Baden (CH); Mats Hyttinen, Ludvika (SE); Goran Eriksson, Vasteras (SE); Axel Kramer, Wettingen (CH); Staffan Norrga, Stockholm (SE); Thomas Alfred Paul, Baden (CH); Uwe Riechert, Glattfelden (CH); Jan Svensson, Vasteras (SE); Frans Dijkhuizen, Skultuna (SE); Ingold Mathias, Unterengstringen (CH)

(72) Inventors: Peter Terwiesch, Mannheim (DE); Navid Mahdizadeh, Baden (CH); Mats Hyttinen, Ludvika (SE); Goran Eriksson, Vasteras (SE); Axel Kramer, Wettingen (CH); Staffan Norrga, Stockholm (SE); Thomas Alfred Paul, Baden (CH); Uwe Riechert, Glattfelden (CH); Jan Svensson, Vasteras (SE); Frans Dijkhuizen, Skultuna (SE); Ingold Mathias, Unterengstringen (CH)

(73) Assignee: ABB Technology AG (CH)

( * ) Notice: Subject to any disclaimer, the term of this patent is extended or adjusted under 35 U.S.C. 154(b) by 232 days.

(21) Appl. No.: 13/919,494

(22) Filed: Jun. 17, 2013

(65) Prior Publication Data
US 2013/0277438 A1  Oct. 24, 2013

Related U.S. Application Data

(63) Continuation of application No. PCT/EP2012/075243, filed on Dec. 12, 2012, and a continuation of application No. PCT/EP2011/072496, filed on Dec. 13, 2011.

(51) Int. Cl.
*H02B 7/01* (2006.01)
*G05D 16/20* (2006.01)
(Continued)

(52) U.S. Cl.
CPC .................. *H02B 7/01* (2013.01); *G05D 16/20* (2013.01); *G05D 22/02* (2013.01); *G05D 23/19* (2013.01); *H02B 5/00* (2013.01); *H02J 1/00* (2013.01); *H02B 5/06* (2013.01)

(58) Field of Classification Search
CPC .............. H02B 5/02; H02B 5/04; H02B 7/00; H02B 7/06; H02B 73/02; H02B 1/04; E04H 5/04; E04B 5/14; H02J 1/00; G05D 16/20; G05D 22/02; G05D 23/19
USPC ......... 361/601–611, 615, 618, 620, 623, 641; 218/3, 9, 10, 44, 52, 59, 81, 140, 153, 218/154, 118, 119, 75; 200/48 R, 48 P; 312/223.2, 201, 223.3; 52/79.9, 79.5, 52/589.1, 264; 174/17 GF, 520
See application file for complete search history.

(56) References Cited

U.S. PATENT DOCUMENTS 1,815,797 A * 7/1931 Probst ........................... 361/602
1,874,808 A * 8/1932 Ruppel ......................... 361/602
(Continued)

FOREIGN PATENT DOCUMENTS

CA       2420574 C     3/2002
CA       2516996 C     9/2004
(Continued)

OTHER PUBLICATIONS

3M(tm) Novec(tm) 1230 Fire Protection Fluid—Brochure ©3M 2008; 6 pages.
(Continued)

*Primary Examiner* — Michail V Datskovskiy
(74) *Attorney, Agent, or Firm* — St. Onge Steward Johnston & Reens LLC

(57) ABSTRACT

A converter building including at least one room having a solid room wall enclosing an interior space and an electrical active part contained in the interior space, the room wall having at least one opening, which is designed such that it allows a human to enter the interior space. The opening is sealable, the room wall encloses the interior space in a gas-tight manner when the opening is sealed, and the interior space contains a dielectric insulation medium including a dielectric insulation component other than air.

51 Claims, 3 Drawing Sheets

(51) Int. Cl.

| | | |
|---|---|---|
| G05D 22/02 | (2006.01) | |
| G05D 23/19 | (2006.01) | |
| H02J 1/00 | (2006.01) | |
| H02B 5/00 | (2006.01) | |
| H02B 5/06 | (2006.01) | |

(56) References Cited

U.S. PATENT DOCUMENTS

| | | | | |
|---|---|---|---|---|
| 1,986,619 | A | * | 1/1935 | Blake .......................... 361/603 |
| 3,150,245 | A | | 9/1964 | Leeds et al. |
| 3,185,734 | A | | 5/1965 | Fawcett et al. |
| 3,201,728 | A | | 8/1965 | McWhirter |
| 3,378,731 | A | * | 4/1968 | Whitehead ................. 361/603 |
| 3,697,819 | A | * | 10/1972 | Eichelberger et al. ........ 361/603 |
| 3,832,605 | A | * | 8/1974 | Clark, Jr. ..................... 174/481 |
| 4,045,634 | A | * | 8/1977 | Nakano et al. ................. 218/75 |
| 4,071,461 | A | | 1/1978 | Mears et al. |
| 4,136,121 | A | | 1/1979 | Martini et al. |
| 4,162,227 | A | | 7/1979 | Cooke |
| 4,166,798 | A | | 9/1979 | Mastroianni et al. |
| 4,175,048 | A | * | 11/1979 | Christophorou et al. . 174/137 B |
| 4,288,651 | A | | 9/1981 | Wootton |
| 4,296,003 | A | | 10/1981 | Harrold et al. |
| 4,350,838 | A | | 9/1982 | Harrold |
| 4,440,971 | A | | 4/1984 | Harrold |
| 4,500,935 | A | * | 2/1985 | Tsuruta et al. ............... 361/603 |
| 4,722,151 | A | * | 2/1988 | Westwell .................... 49/477.1 |
| 4,827,379 | A | * | 5/1989 | Fujimoto .................... 361/826 |
| 4,866,569 | A | * | 9/1989 | Okumura et al. ............ 361/618 |
| 5,210,679 | A | * | 5/1993 | Takamoto et al. ........... 361/618 |
| 5,399,718 | A | | 3/1995 | Costello et al. |
| 5,466,877 | A | | 11/1995 | Moore |
| 5,648,888 | A | * | 7/1997 | Le Francois et al. ......... 361/603 |
| 5,730,894 | A | | 3/1998 | Minor |
| 5,731,561 | A | | 3/1998 | Manthe et al. |
| 5,858,065 | A | | 1/1999 | Li et al. |
| 5,998,671 | A | | 12/1999 | Van Der Puy |
| 6,215,653 | B1 | * | 4/2001 | Cochran et al. .............. 361/602 |
| 6,233,137 | B1 | * | 5/2001 | Kolos et al. .................. 361/603 |
| 6,276,190 | B1 | | 8/2001 | Zamfes |
| 6,394,107 | B1 | | 5/2002 | Kesari et al. |
| 6,403,149 | B1 | | 6/2002 | Parent et al. |
| 6,478,979 | B1 | | 11/2002 | Rivers et al. |
| 6,853,541 | B2 | * | 2/2005 | Anheuer et al. .............. 361/602 |
| 7,074,343 | B2 | | 7/2006 | Minor et al. |
| 7,128,133 | B2 | | 10/2006 | Costello et al. |
| 7,184,895 | B2 | | 2/2007 | Chetay et al. |
| 7,314,576 | B2 | | 1/2008 | Minor et al. |
| 7,390,427 | B2 | | 6/2008 | Costello et al. |
| 7,416,679 | B2 | | 8/2008 | Minor et al. |
| 7,736,529 | B2 | | 6/2010 | Luly et al. |
| 7,742,283 | B2 | | 6/2010 | Hama et al. |
| 7,816,618 | B2 | | 10/2010 | Uchii |
| 7,923,630 | B2 | | 4/2011 | Richardson |
| 8,080,185 | B2 | | 12/2011 | Luly et al. |
| 8,245,512 | B2 | | 8/2012 | Schwiegel et al. |
| 8,683,753 | B2 | * | 4/2014 | Bachorz et al. ................ 52/79.5 |
| 8,896,987 | B2 | * | 11/2014 | Kampfer et al. ............. 361/603 |
| 2002/0095262 | A1 | | 7/2002 | Chetay et al. |
| 2003/0007543 | A1 | | 1/2003 | Grenfell et al. |
| 2003/0235026 | A1 | | 12/2003 | Anheuer et al. |
| 2004/0056234 | A1 | | 3/2004 | Belt et al. |
| 2004/0197474 | A1 | | 10/2004 | Vrtis et al. |
| 2005/0127322 | A1 | | 6/2005 | Costello et al. |
| 2006/0210711 | A1 | | 9/2006 | Hayashi et al. |
| 2007/0221626 | A1 | | 9/2007 | Uchii |
| 2008/0135817 | A1 | | 6/2008 | Luly et al. |
| 2009/0078680 | A1 | | 3/2009 | Franck et al. |
| 2009/0095717 | A1 | | 4/2009 | Luly et al. |
| 2009/0109604 | A1 | | 4/2009 | Yanabu et al. |
| 2010/0263885 | A1 | | 10/2010 | Tuma |
| 2011/0083379 | A1 | * | 4/2011 | Lavi ............................... 52/79.1 |
| 2011/0192821 | A1 | | 8/2011 | Dufournet |
| 2011/0232870 | A1 | | 9/2011 | Flynn et al. |
| 2012/0085735 | A1 | | 4/2012 | Uchii et al. |
| 2012/0145521 | A1 | * | 6/2012 | Glasmacher ................... 200/293 |
| 2012/0152904 | A1 | | 6/2012 | Hyrenbach et al. |

FOREIGN PATENT DOCUMENTS

| | | | | |
|---|---|---|---|---|
| CN | 101197221 | A | 6/2008 | |
| DE | 548450 | C | 6/1934 | |
| DE | 641963 | C | 2/1937 | |
| DE | 3215234 | A1 | 10/1983 | |
| DE | 004139177 | A1 * | 6/1992 | ............... H02B 7/00 |
| DE | 19519301 | A1 | 11/1996 | |
| DE | 202009009305 | U1 | 11/2009 | |
| DE | 102009025204 | C5 | 1/2013 | |
| EP | 0131922 | A1 | 1/1985 | |
| EP | 0545430 | A1 | 6/1993 | |
| EP | 0670294 | B1 | 9/1995 | |
| EP | 000821457 | A1 * | 1/1998 | ............... H02B 7/01 |
| EP | 1085365 | A2 | 3/2001 | |
| EP | 1132746 | A2 | 9/2001 | |
| EP | 1146522 | A1 | 10/2001 | |
| EP | 1221612 | A1 | 7/2002 | |
| EP | 1261398 | B1 | 12/2002 | |
| EP | 1498941 | A2 | 1/2005 | |
| EP | 1764487 | A1 | 3/2007 | |
| EP | 1933432 | A1 | 6/2008 | |
| EP | 002257146 | A2 * | 12/2010 | ................ E04H 5/04 |
| EP | 2525454 | A2 | 11/2012 | |
| FR | 2930019 | A1 | 10/2009 | |
| FR | 2955970 | A1 | 8/2011 | |
| GB | 753375 | A | 7/1956 | |
| GB | 1194431 | A | 6/1970 | |
| JP | 408065836 | A * | 3/1996 | ............. H02B 13/02 |
| JP | 8306549 | A | 11/1996 | |
| JP | 2738997 | B2 | 4/1998 | |
| JP | 2879848 | B1 | 4/1999 | |
| JP | 11286679 | A | 10/1999 | |
| JP | 2000059935 | A | 2/2000 | |
| JP | 2000224722 | A | 8/2000 | |
| JP | 2001086611 | A | 3/2001 | |
| JP | 2005126480 | A | 5/2005 | |
| JP | 2007300716 | A | 11/2007 | |
| JP | 2010021263 | A | 1/2010 | |
| JP | 2010131584 | A | 6/2010 | |
| JP | 2010171173 | A | 8/2010 | |
| KR | 20070080895 | A | 8/2007 | |
| RU | 2276164 | C2 | 5/2006 | |
| WO | 9317488 | A1 | 9/1993 | |
| WO | 0024814 | A1 | 5/2000 | |
| WO | 0105468 | A1 | 1/2001 | |
| WO | 0250173 | A2 | 6/2002 | |
| WO | 02086191 | A1 | 10/2002 | |
| WO | 02086192 | A1 | 10/2002 | |
| WO | 02103319 | A1 | 12/2002 | |
| WO | 03022981 | A1 | 3/2003 | |
| WO | 2004090177 | A1 | 10/2004 | |
| WO | 2007013169 | A1 | 2/2007 | |
| WO | 2007075804 | A1 | 7/2007 | |
| WO | 2007136948 | A2 | 11/2007 | |
| WO | 2008073790 | A2 | 6/2008 | |
| WO | 2010108934 | A1 | 9/2010 | |
| WO | 2010142346 | A1 | 12/2010 | |
| WO | 2010146022 | A1 | 12/2010 | |
| WO | 2011019456 | A1 | 2/2011 | |
| WO | 2011054870 | A1 | 5/2011 | |
| WO | 2011090992 | A1 | 7/2011 | |
| WO | 2011119421 | A1 | 9/2011 | |
| WO | 2011119456 | A1 | 9/2011 | |
| WO | 2012038442 | A1 | 3/2012 | |
| WO | 2012038443 | A1 | 3/2012 | |

OTHER PUBLICATIONS

3M(tm) Flüssigkeiten für das Wärmemanagement and Elektro-/Elektronik-Testen—Brochure © 3M 2010; 8 pages.

Yamamoto et al, "Applying a Gas Mixture Containing c-C4F8 as an Insulation Medium", IEEE Transactions on Dielectrics and electrical Insulation, vol. 8 No. 6, Dec. 2001 (abstract only—2 pages.).

(56) References Cited

OTHER PUBLICATIONS

Cartwright, et al.; "Barrow Offshore Windfarm Design & Build of UKs First OWF Sub-Station"; Vestas KBR; Oct. 2005; 26 pages.
Kynast, et al.; "Basic investigations concerning equipment with liquefied SF6 under extreme low temperatures"; Technical Colloquium; 2011; 8 pages.
Milbrath; "Development of 3MTM NovecTM 612 Magnesium Protection Fluid as a Substitute for SF6 over Molten Magnesium"; Presented at the International Conference on SF6 and the Environment, Nov. 21-22, 2002.
International Search Report and Written Opinion of the International Searching Authority Application No. PCT/EP2011/072496 Completed: Oct. 15, 2012; Mailing Date: Oct. 24, 2012 16 pages.
International Search Report and Written Opinion of the International Searching Authority Application No. PCT/EP2012/075243 Completed: Feb. 6, 2013; Mailing Date: Feb. 14, 2013 12 pages.
Smith, et al.; "Perfluoroisopropyl Ketones—The Chemistry of Carbonyl Fluoride. II. Synthesis of Pertluoroisopropyl Ketones"; Journal of the American Chemical Society (J. Am. Chem. Soc.), vol. 84, pp. 4285-4288, 1962.
Seimens Alarm Brochure—2005; 40 pages.
Abb, et al.; "Valhall Re-Development Project, Power From Shore"; Mar. 17, 2010; 5 pages.
Anonymous: "CBWatch-2 Modular Circuit Breaker Monitoring System"; Alstom Product Brochure; Sep. 1, 2010; 4 pages.
Niemeyer, Lutz. "CIGRE Guide for SF6 gas mixtures. Application and Handling in electric power Equipment." ABB Corp Research Cetre; 2000; 8 pages.
Hillers, et al.; "Control, Monitoring and Diagnostics for High Voltage GIS"; IEE Colloquim on GIC (Gas-Insulated Switchgear); Nov. 14, 1995; pp. 6/1-6/4.
Brand, "Dielectric Strength, Boiling Point and Toxicity of Gases—Different Aspects of the Same Basic Molecular Properties"; Oct. 1982; pp. 451-456.
3M(tm); "Fluorochemicals in Heat Transfer Applications"; Jun. 21, 2000; 27 pages.
Tuma, "Fluoroketone C2F5C(O)CF(CF3)2 as a Heat Transfer Fluid for Passive and Pumped 2-Phase Applications"; 24th IEEE Semi0Therm Symposium; 2008; 8 pages.
Christophorou, et al.; "Gases for electrical insulation and arc interruption : possible present and future alternatives to pure SF6"; NIST Technical Note 1425; Nov. 1997; 48 pages.

\* cited by examiner

CONVERTER BUILDING

FIELD OF THE INVENTION

The present invention relates to a converter building, as e.g. comprised in an HVDC station, an HVAC station or an HVAC/HVDC station, in particular an HVDC onshore or offshore station.

BACKGROUND OF THE INVENTION

HVDC (high-voltage, direct current) electric power transmission systems use direct current for the bulk transmission of electrical power. In particular for the transmission over long distances, HVDC systems suffer lower electric losses than alternating current (AC) systems.

Electric energy generated in e.g. large wind farms is typically collected in AC offshore stations and transmitted to HVDC offshore stations where the conversion from AC to DC is performed.

The platform of these stations comprises a converter building in which the respective electrical active parts are arranged. The size and weight of the converter building and of the platform, respectively, are related to the power capacity of the station.

For example, the platform of a 1000 MW HVDC station has a weight of roughly 10,000 tons. The volume of the respective converter building is typically in the order of several 10,000 m$^3$. In a conventional Dolwin converter, for example, one valve hall alone typically has a size in the order of about 10,000 m$^3$.

At present such platforms must be large in size in order to handle the required amounts of electric power. High voltages are needed to keep the currents, electric losses and conductor or cable cross-sections sufficiently low. High voltages need long insulation distances and thus require a lot of space, if air is used as the insulation medium. Air, while having the advantage of being available ubiquitously at no cost, has a rather low insulation performance. Furthermore, installation of a platform comprising a converter building of this weight and size may require cranes with extremely high capacity which are rarely available. Thus, conventional HVDC offshore stations suffer from their enormous size and weight.

A reduction in size and weight of the platform and the converter building is highly desirable to simplify the complexity of installation, operation, maintenance, and deconstruction of conventional stations.

SUMMARY OF THE INVENTION

One object of the present invention is thus to provide a converter building, in particular for the use for an HVDC station, an HVAC station or an HVAC/HVDC station, which is smaller in size and weight than conventional converter buildings and thus allows for a simpler and ultimately less costly installation of the station.

The object is solved by the converter building, the method and the use according to the present teachings. Preferred embodiments are given in the dependent claims.

The converter building of the present invention comprises at least one room (also designated a "hall"), which has a solid room wall enclosing an interior space, in which an electrical active part is contained.

According to the invention, the room wall has at least one opening which is sealable, preferably a door and more preferably a door having gas-tight sealing means. The opening is designed such that it allows a human to enter the interior space. Thus, shape and dimensions of the opening are such that a human can pass through it.

The room wall encloses the interior space in a gas-tight manner when the opening is sealed. This allows the interior space to contain a dielectric insulation medium comprising a dielectric insulation component C1 other than air. Thereby, sealing serves for reducing, minimizing or even avoiding leakage of the dielectric insulation component C1 other than air to the outside and thus ultimately to the environment. The sealing means need not necessarily be tight against higher over-pressures, such as several bars.

The term "converter building" is in the context of the present invention to be understood as a construction having the size of a house or a plant.

In this converter building, one or more rooms are comprised, which likewise have the size of a room in a house or of a hall in a plant. Particularly, the term "room" is not to be interpreted as meaning an encapsulation, as for a gas-insulated substation (GIS), but in the context of the present invention refers to a room of much greater dimensions, which—as such—can for example even comprise a GIS.

The term "solid room wall" refers to the wall surrounding and enclosing the interior space of the room. It can be made of any material suitable for a converter building, and in particular can comprise a construction material, such as concrete and/or an open metal construction. The room may or may not comprise a window, for example a glass window or a plastic window.

The term "opening" relates to a passage in the room wall having a shape and dimension that allows a human to pass through the opening and thus to enter the interior space of the room.

The term converter building is also to be understood broadly to encompass a building for housing any electrically active parts for generally converting electrical energy, in particular for generating, transmitting, distributing or transforming electrical energy. For example, such converting of electrical energy can comprise, inter alia, conversion of electrical energy between alternating current (AC) and direct current (DC), between different voltage levels, between different AC-frequencies, between different locations, or between electrical energy and other forms of energy, for example thermal and electrical energy or between electrical and mechanical energy. Converter building thus can encompass also buildings for housing generators, transformers, electrically rotating machines, and the like.

Converter building shall also encompass any buildings being equipped with at least one not-encapsulated electrical parts, such as life-tank apparatuses or generally apparatuses designed for or like in conventional air-insulated substations. Therefore, the converter building according to the invention may also be or comprise or be comprised in a hybrid or non-encapsulated in-house gas-insulated substation, with the converter building comprising at least one room having a solid room wall enclosing an interior space and an electrical active part, i.e. at least one electrical active part, contained in said interior space, the room wall having at least one opening, which is designed such that it allows a human to enter the interior space, wherein the opening is sealable, the room wall encloses the interior space in a gas-tight manner when the opening is sealed, and the interior space contains a dielectric insulation medium comprising a dielectric insulation component C1 other than air. In particular, the electrical active parts can be designed as non-encapsulated electrical active parts and, in particular, like conventional air-insulated components, but can be reduced substantially in size and/or with respect to insulation distances due to the higher insulation capability of the specific dielectric insulation medium compared to pure air. Such components can thus be arranged inside the interior space of the openable and sealable room of the converter building with reduced clearance distances, i.e. insulation distances, for example between different phases or between phase and ground, compared to conventional air-insulated substations.

Thus, in an embodiment the building, in particular converter building, comprises or is comprised in a medium and/or high voltage substation comprising at least one non-encapsulated gas-insulated electrical active part.

Throughout this application, the term "non-encapsulated" is to be understood broadly as an electrical active part that is exposed to and insulated by, in particular in operation requires insulation by, the dielectric insulation medium and in particular the dielectric insulation component C1.

The term "electrical active part" is to be understood as any electrical component used for generating, transmitting, distributing or using electrical energy, and in particular exemplarily relates to any such component present in a converter station, a detailed specification of which components is given below. In particular, the term "electrical active part" encompasses—and according to a preferred embodiment means—a non-encapsulated electrical active part. The term "electrical active part" encompasses medium voltage electrical active parts and/or high voltage electrical active parts and/or heavy-current carrying electrical active parts, preferably high voltage electrical active parts, more preferably high voltage electrical active parts above 72 kV. The term "medium voltage" as used herein refers to a voltage in the range of 1 kV to 72 kV, whereas the term "high voltage" refers to a voltage of more than 72 kV. Heavy current is to be understood as currents for example above 1 kA, and in particular above 10 kA. In particular, "electrical active part" can encompass a medium voltage electrical active part operated at medium voltage and with heavy currents, such as in a generator circuit breaker.

According to a preferred embodiment, the dielectric insulation medium (comprising the dielectric insulation component C1), which is contained in the interior space of the room, is not or is not solely contained in an encapsulation.

In general, the dielectric insulation medium C1 has a higher dielectric strength than air. It typically has an atmospheric boiling point of less than 60° C., a low Global Warming Potential (GWP) of less than 700 (over a 100 year time horizon) and zero Ozone Depletion Potential (ODP).

In the context of the present invention, the term "boiling point" is to be understood as boiling point at atmospheric pressure, i.e. at about 1 bar.

The dielectric insulation component C1 is typically at least partially in gaseous phase at operational conditions. It is preferably non-corrosive, non-explosive, thermally stable up to 140° C. and non-toxic (or has a low toxicity level).

In embodiments, the dielectric insulation medium comprises gas and preferably is gaseous under operating conditions of the building or converter building. As well in further embodiments, the dielectric insulation component C1 comprises gas and preferably is gaseous under operating conditions of the building or converter building.

Due to the fact that the room wall encloses the interior space in a gas-tight manner when the opening is sealed, there is no leakage of the insulation medium comprising insulation component C1 out of the interior space when the converter building is under operation.

Given the improved dielectric insulation achieved by using insulation component C1, the insulation and clearance distances can be reduced compared to respective distances in a conventional converter building of e.g. an HVDC offshore station. Ultimately, this allows for a substantial reduction in the overall size and weight and consequently for a simpler and less costly installation.

Particularly, the dielectric insulation medium is thereby breathable without health risk at least for a certain time, in particular is breathable without health risk when using a gas mask or even when not using a gas mask, and preferably comprises air or an air component.

According to a further exemplary embodiment, a door is attributed to the at least one opening, said door being moveable, in particular pivotable or slidable, with respect to the opening from a first state, in which the opening is open, to a second state, in which the opening is closed, and vice versa.

Any door suitable for the purpose of the present invention can be used. In embodiments, the room of the building or converter building can be equipped for example with a hinged door with a horizontal or vertical pivoting axis, a sliding door, in particular a pocket door, or a rotating door. The door is closable either with or without a human having entered the interior space, more particularly from the inside (i.e. the interior space) and/or from the outside. The closing of the door can be carried out manually and/or automatically. In a preferred embodiment, the door is a double door or an air lock door or a revolving door which allows entrance and leave of a person via a sluice with only exceptionally little loss of the dielectric insulation medium, and in particular little loss of pressure and/or little loss of concentration of the dielectric insulation component C1.

In embodiments, the door is, in particular the door has sealing means, for preventing humidity, such as humid air, to enter the room from the outside. The sealing means for preventing entry of humidity into the room can be, but need not be, the same as the sealing means for preventing outflow of the dielectric insulation medium or of the dielectric insulation component C1 out of the room.

As mentioned, the opening is sealable. This means that sealing means are attributed to the opening for providing a gas-tight closure, thus ultimately allowing the interior space to be enclosed in a gas-tight manner. Any kind of sealing means, which is suitable for the purposes of the present invention, can be used, in particular a gasket, more particularly an O-ring or any other gasket made of an elastomer. The level of gas-tightness shall be such that leakage of the dielectric insulation component C1 other than air is sufficiently reduced and a concentration of the dielectric insulation component C1 is maintained for keeping the dielectric insulation in the building or room above a critical threshold level. This threshold level shall be higher than the dielectric withstand capability of air, in particular of ambient air or of dry air, during a sufficiently long time period, in particular for example during an operating time interval without refilling over a day, a week or a month.

In addition, during time intervals when the opening is used by a person to enter or leave the room or building, a slight loss or leakage of the dielectric insulation component C1 to the outside and ultimately to the environment is tolerable. In particular, the loss in dielectric insulation performance is even tolerable, if a typical or reasonable or pre-determined duration and number of door openings is performed during the operating time interval until refilling, i.e. between refilling time instances.

In particular, the sealing means are arranged between the surface of the room wall in a region surrounding the opening and the surface of the door. If the sealing means are in the form of an O-ring, for example, it is seated in a groove, e.g. in the surface of the room wall surrounding the opening. During closing of the opening, the O-ring is compressed by the surface of the door when being moved towards the opening.

In addition or alternatively to tolerating such slight leakage by opening the door, the allowable leakage by opening the door can actively be compensated for by refilling the dielectric insulation medium and in particular the dielectric insulation component C1. As outlined herein, the room can be equipped with refilling means, such as injection means or spraying nozzles—in particular in combination with a fan or circulation means—as disclosed herein, for refilling the dielectric insulation medium and in particular the dielectric insulation component C1.

In embodiments, the refilling means can be activated in regular time intervals, and/or by opening and/or closing the door, and/or in a controlled manner. Activation in regular time intervals can be done based on pre-determined regular leakage rates, when the door is closed, and on pre-determined inspection or maintenance leakage rates, when the door is opened for a person to enter or leave the room. Activation in a controlled manner can comprise automatic activation upon opening and/or closing the door, activation as a function of a number of door openings and/or as a function of a total door-open time during which the door has been open or has not been closed, activation each time after the door has been closed again, and/or activation after the person has left the room again, i.e. when no person is present in the room.

Activation in a controlled manner requires monitoring means for sensing the dielectric insulation medium inside the room and control means for regulating the dielectric insulation medium to a desired operating range. The monitoring means may be or comprise or be comprised in the monitoring means disclosed hereinafter, in particular in connection with FIG. 3. The control means may be or comprise be comprised in the controlling means disclosed hereinafter, in particular in connection with FIG. 3.

In embodiments, control means for automatic activating the refilling means may be such, that refilling is activated when a threshold level of required dielectric strength of the dielectric insulation medium, in particular a threshold concentration of the dielectric insulation component C1, is approached or undershot. Alternatively or in addition, the refilling means can be activated manually, for example during every instance when the door has been opened, or semi-manually, wherein opening and/or closing the door activates the refilling means.

In an embodiment, the refilling means can for example and inter alia be arranged in close neighbourhood to the door. This allows refilling the dielectric insulation medium and in particular the dielectric insulation component C1 at the location where the relatively largest losses occur. In alternative or additional embodiments, the refilling means can for example and inter alia be arranged in close neighbourhood of the at least one non-encapsulated electrical active part, and preferably in greater distance or greatest possible distance from the door. This allows maintaining the dielectric strength at the non-encapsulated component as high as possible while keeping the exposure of personnel to the dielectric insulation medium and in particular the dielectric insulation component C1 as low as possible.

In the context of this invention, it is emphasized once more that opening the door and having a person entering the room housing the electrical active parts is possible with the electrical active parts, in particular the at least one non-encapsulated electrical active part, being in operation, i.e. being under medium and/or high voltage, and/or under currents or heavy currents. As well, opening the door and having a person entering the room housing the electrical active parts is also possible when the electrical parts are inactivated, i.e. out of operation, but the dielectric insulation medium and in particular the dielectric insulation component C1 has not or not yet been evacuated.

Preferably, the dielectric insulation medium and in particular the dielectric insulation component C1 is or are chosen such that evacuation of the room is not required at all, also not during a person being present in the room, as may be required for inspection or maintenance purposes.

It is understood that the converter building can—apart from the above mentioned room, the interior space of which comprises the specific insulation medium with the insulation component C1—also comprise at least one room which is solely filled with (dry) air. This is preferably the case for rooms which require frequent maintenance and/or for which only a relatively small reduction of the volume by using the specific insulation medium can be achieved.

According to a preferred embodiment, the dielectric insulation component C1 is an organofluorine compound, i.e. an organic chemical compound containing carbon and fluorine atoms, at least some of which being bonded in a carbon-fluorine bond.

According to a particularly preferred embodiment, the dielectric insulation component C1 is selected from the group consisting of a fluoroketone, a hydrofluoro monoether and mixtures thereof.

In alternative or additional embodiments, the dielectric insulation component C1 is selected from the group consisting of: perfluoroethers, perfluoromonoethers, perfluorodiethers, perfluoropolyethers; linear, branched or cyclic perfluoroethers; linear, branched or cyclic perfluoropolyethers; and mixtures thereof; and mixtures with any other dielectric insulation component C1, in particular with at least one of the fluoroketones and hydrofluoro monoethers.

It is further preferred that the insulation medium comprises in addition to the dielectric insulation component C1 at least one further dielectric insulation component $C2, \ldots, Cn$, said further dielectric insulation component $C2, \ldots, Cn$ being air or an air component, in particular being selected from the group consisting of: nitrogen, oxygen, carbon dioxide, noble gases, and mixtures thereof. The insulation medium is typically a mixture of the insulation component C1 with air, more particularly dry air. In analogy to the above, the further dielectric component $C2, \ldots, Cn$ is preferably present in amounts in which it is non-toxic when inhaled. If there are concerns regarding the toxicity of the insulation medium, the interior space can be evacuated prior to the entering—as will be shown in detail below—or can be accessed with a gas mask to protect the wearer from inhaling the insulation medium.

According to a particularly preferred embodiment, the insulation medium is devoid of sulphur hexafluoride $SF_6$. The safety requirements, in particular health safety requirements, imposed on electrical devices using $SF_6$ are thus avoided.

With regard to the use of a fluoroketone, it is particularly preferred that it contains from 4 to 12 carbon atoms, preferably from 5 to 7 carbon atoms, most preferably exactly 5 or exactly 6 carbon atoms.

With regard to the use of a hydrofluoro monoether, it is particularly preferred that it contains at least 3 carbon atoms, more preferably exactly 3 or exactly 4 carbon atoms.

The fluoroketones and hydrofluoro monoethers mentioned above not only have high insulation capabilities, in particular a relatively high dielectric strength, they are in general also non-toxic (or have a very low toxicity level) and are non-corrosive, non-flammable and non-explosive. Said compounds thus comply fully with safety requirements, as prescribed for the use in e.g. an HVDC offshore station.

Given the non-toxicity or low toxicity level of the compounds of the above mentioned group, no complete removal of the insulation component C1 from the interior space has to be ensured, when the interior space has to be entered e.g. for maintenance purposes, since residues of the insulation component will be harmless to the operator exposed to it.

The compounds of the above mentioned group further have a low GWP and an ODP of 0; they are thus favourable from an environmental perspective. Even in the case that leakage out of the interior space occurs, the compounds have no negative impact on the atmosphere.

The term "fluoroketone" as used herein shall be interpreted broadly and shall encompass both perfluoro-ketones and hydrofluoroketones. The term shall also encompass both saturated compounds and unsaturated compounds including double and/or triple bonds between carbon atoms. The at least partially fluorinated alkyl chain of the fluoroketones can be linear or branched and can optionally form a ring.

The term "fluoroketone" shall encompass compounds that may comprise in-chain heteroatoms, i.e. at least one heteroatom replacing a carbon atom. In exemplary embodiments the fluoroketone shall have no in-chain heteroatom.

The term "fluoroketone" shall also encompass fluorodiketones having two carbonyl groups or fluoroketones having more than two carbonyl groups. In exemplary embodiments, the fluoroketone shall be a fluoromonoketone.

According to a preferred embodiment, the fluoroketone is a perfluoroketone. It is preferred that the fluoroketone has a branched alkyl chain. It is also preferred that the fluoroketone is fully saturated.

According to a further preferred embodiment, the fluoroketone has exactly five carbon atoms and is selected from the group consisting of the compounds defined by the following structural formulae in which at least one hydrogen atom is substituted with a fluorine atom:

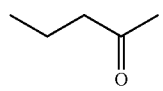

(Ia)

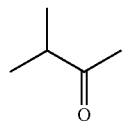

(Ib)

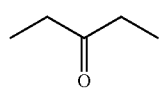

(Ic)

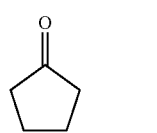

(Id)

Compared to fluoroketones having a greater chain length with more than 5 carbon atoms, fluoroketones containing 5 carbon atoms have the advantage of a relatively low boiling point, allowing to have a relatively high molar fraction of such 5-carbon fluoroketones in the insulation medium and avoiding the problem of liquefaction even at low temperatures.

Fluoroketones containing 5 or more carbon atoms are further advantageous, because they are generally non-toxic.

Further, the fluoroketones having a branched alkyl chain are generally preferred, because their boiling points are lower than the boiling points of the corresponding compounds (i.e. compounds with same molecular sum formula) having a straight alkyl chain.

In a particularly preferred embodiment, the fluoroketone has the molecular formula $C_5F_{10}O$, i.e. is fully saturated without any double or triple bond between carbon atoms. The fluoroketone may more preferably be selected from the group consisting of 1,1,1,3,4,4,4-heptafluoro-3-(trifluoromethyl)butan-2-one (also named decafluoro-3-methylbutan-2-one), 1,1,1,3,3,4,4,5,5,5-decafluoropentan-2-one, 1,1,1,2,2,4,4,5,5,5-decafluoropentan-3-one, 1,1,1,4,4,5,5,5,-octafluoro-3-bis(trifluoromethyl)-pentan-2-one; and most preferably is 1,1,1,3,4,4,4-heptafluoro-3-(trifluoromethyl)butan-2-one.

Among the fluoroketones containing exactly 5 carbon atoms, 1,1,1,3,4,4,4-heptafluoro-3-(trifluoromethyl)butan-2-one, here briefly cited by the generic term "C5-ketone" (=fluoroketone containing exactly 5 carbon atoms), with molecular formula $CF_3C(O)CF(CF_3)_2$ or $C_5F_{10}O$, has been found to be particularly preferred because it has the advantages of a high dielectric insulation performance, in particular in mixtures with a dielectric carrier gas component, a very low GWP and a low boiling point. It has an ozone depletion potential of 0 and is practically non-toxic.

1,1,1,3,4,4,4-heptafluoro-3-(trifluoromethyl)butan-2-one can be represented by the following structural formula (I):

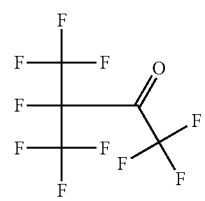

(I)

According to a further preferred embodiment, the fluoroketone has exactly six carbon atoms and is at least one compound selected from the group consisting of the compounds defined by the following structural formulae in which at least one hydrogen atom is substituted with a fluorine atom:

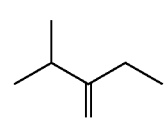

(IIa)

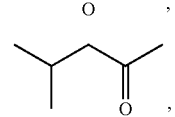

(IIb)

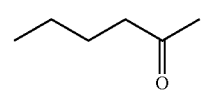

(IIc)

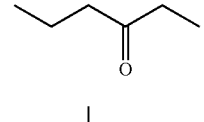

(IId)

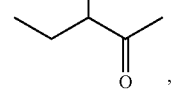

(IIe)

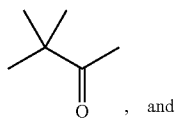 (IIf)

and

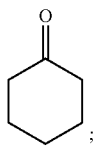 (IIg)

;

According to a further preferred embodiment, the fluoroketone has exactly seven carbon atoms and is at least one compound selected from the group consisting of the compounds defined by the following structural formulae in which at least one hydrogen atom is substituted with a fluorine atom:

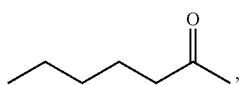 (IIIa)

,

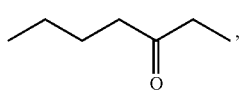 (IIIb)

,

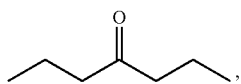 (IIIc)

,

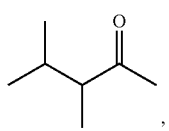 (IIId)

,

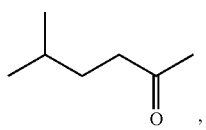 (IIIe)

,

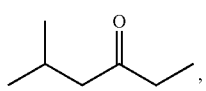 (IIIf)

,

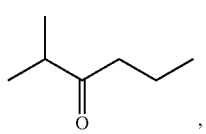 (IIIg)

,

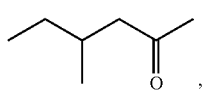 (IIIh)

,

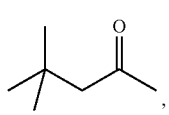 (IIIi)

,

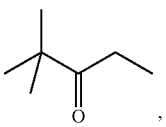 (IIIj)

,

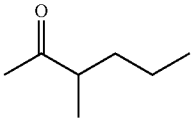 (IIIk)

,

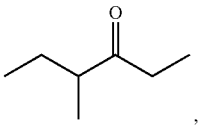 (IIIl)

,

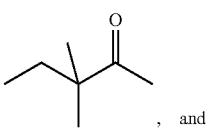 (IIIm)

, and

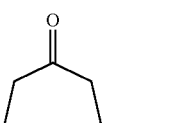 (IIIn)

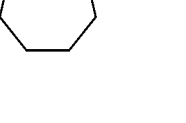

named dodecafluoro-cycloheptanone.

The present invention encompasses each compound or combination of compounds selected from the group consisting of the compounds according to structural formulae Ia to Id, IIa to IIg, IIIa to IIIn.

A fluoroketone containing exactly 6 carbon atoms is particularly preferred for the purpose of the present invention; such a fluoroketone is non-toxic and has outstanding margins for human safety.

In particular, the fluoroketone has the molecular formula $C_6F_{12}O$. More preferably, the fluoroketone is selected from the group consisting of 1,1,1,2,4,4,5,5,5-nonafluoro-2-(trifluoromethyl)pentan-3-one (also named dodecafluoro-2-methylpentan-3-one), 1,1,1,3,3,4,5,5,5-nonafluoro-4-(trifluoromethyl)pentan-2-one (also named dodecafluoro-4-methylpentan-2-one), 1,1,1,3,4,4,5,5,5-nonafluoro-3-(trifluoromethyl)pentan-2-one (also named dodecafluoro-3-methylpentan-2-one), 1,1,1,3,4,4,4-heptafluoro-3-bis-(trifluoromethyl)butan-2-one (also named dodecafluoro-3,3-(dimethyl)butan-2-one), dodecafluorohexan-2-one and dodecafluorohexan-3-one, and particularly is the mentioned 1,1,1,2,4,4,5,5,5-nonafluoro-2-(trifluoromethyl)pentan-3-one.

1,1,1,2,4,4,5,5,5-Nonafluoro-2-(trifluoromethyl)pentan-3-one (also named dodecafluoro-2-methylpentan-3-one or perfluoro-2-methyl-3-pentanone) can be represented by the following structural formula (II):

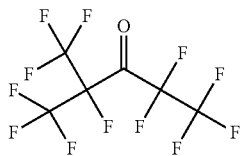
(II)

1,1,1,2,4,4,5,5,5-Nonafluoro-4-(trifluoromethyl)pentan-3-one, here briefly cited by the more generic term "C6-ketone" (=fluoroketone comprising exactly 6 carbon atoms), with molecular formula $C_2F_5C(O)CF(CF_3)_2$ has been found to be particularly preferred because of its high insulating properties and its extremely low GWP. It has an ozone depletion potential of 0 and is non-toxic (LC50 of about 100,000 ppm). Thus, the environmental impact is much lower than with conventional insulation gases, and at the same time outstanding margins for human safety are achieved.

1,1,1,2,4,4,5,5,5-Nonafluoro-4-(trifluoromethyl)pentan-3-one is particularly useful when the converter building of the present invention is used in an HVDC station, an HVAC station or an HVAC/HVDC station, in particular an HVDC onshore or offshore station, as in these applications the operational temperature is such that a sufficient fraction of the compound is in gaseous phase during operation.

The term "hydrofluoro monoether" as used in the context of the present invention, refers to a compound having one and only one ether group, said ether group linking two alkyl groups, which can be, independently from each other, linear or branched.

The term "hydrofluoro monoether" as used in the context of the present invention is further to be understood as a compound which is partially hydrogenated and partially fluorinated.

By using a hydrofluoro monoether, an insulation medium having high insulation capabilities, in particular a high dielectric strength (or breakdown field strength), and at the same time a low GWP, can be achieved.

Also, the insulation medium is chemically and thermally stable to temperatures above 140° C., non-toxic (or has a low toxicity level), non-corrosive and non-explosive.

Hydrofluoro monoethers can participate in a very efficient tropospheric removal process which involves hydrogen abstraction by an OH radical. Ultimately, this results in a relatively low atmospheric lifetime of the compound.

Due to their relatively low atmospheric lifetime, hydrofluoro monoethers also have a relatively low GWP, as already mentioned. Specifically, an insulating medium having a GWP of less than 1,000 over 100 years, more specifically of less than 700 over 100 years, can be obtained.

Apart from their relatively low atmospheric lifetime, hydrofluoro monoethers are also devoid of halogen atoms that play a role in the ozone destruction catalytic cycle, namely Cl, Br or I. Therefore, the dielectric insulation medium comprising a hydrofluoro monoether has the further advantage of zero ODP, which is very favourable from an environmental perspective.

Preferably, the hydrofluoro monoether of the present invention contains at least 3 carbon atoms.

Hydrofluoro monoethers containing at least 3 carbon atoms generally have a boiling point of higher than −20° C. at ambient pressure. The preference for a hydrofluoro monoether containing at least 3 carbon atoms and thus having a relatively high boiling point of more than −20° C. is based on the finding that a higher boiling point of the hydrofluoro monoether generally goes along with a higher dielectric strength.

According to a preferred embodiment of the present invention, the hydrofluoro monoether contains exactly 3 or exactly 4 carbon atoms, most preferably exactly 3 carbon atoms.

More particularly, the hydrofluoro monoether is thus at least one compound selected from the group consisting of the compounds defined by the following structural formulae in which a part of the hydrogen atoms is substituted by a fluorine atom:

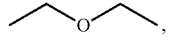 (IVa)

 (IVb)

 (IVc)

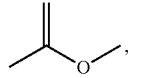 (IVd)

 (IVe)

 (IVf)

 and (IVg)

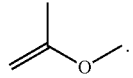 (IVh)

By using a hydrofluoro monoether containing exactly 3 or exactly 4 carbon atoms, a gaseous insulation medium can be achieved, which does not liquefy under typical operational conditions and which at the same time has a relatively high dielectric strength.

Furthermore, by using a hydrofluoro monoether containing exactly 3 or exactly 4 carbon atoms, an insulating medium can be achieved, which is non-explosive and thus complies even with high safety requirements.

In summary, by using a hydrofluoro monoether containing exactly 3 or exactly 4 carbon atoms a non-explosive dielectric insulation medium having a high dielectric strength relative to air and having at the same time a boiling point of less than 30° C. can be achieved. This is of particular relevance for the use of the insulation medium in a converter building.

Considering flammability of the compounds, it is further preferred that the ratio of the number of fluorine atoms to the total number of fluorine and hydrogen atoms, here briefly called "F-rate", of the hydrofluoro monoether is at least 5:8. It has been found that compounds falling within this definition are generally non-flammable and thus result in an insulation medium complying with highest safety requirements.

According to a further preferred embodiment, the ratio of the number of fluorine atoms to the number of carbon atoms, here briefly called "F/C-ratio", ranges from 1.5:1 to 2:1. Such compounds generally have a GWP of less than 1,000 over 100 years, thus leading to a very environment-friendly insulation medium. It is particularly preferred that the hydrofluoro monoether has a GWP of less than 700 over 100 years.

Regarding the environmental aspect, it is further preferred that the hydrofluoro monoether also has an ODP of 0, as mentioned above.

The above mentioned desirable effects can in particular be achieved by a hydrofluoro monoether having the general structure (IV)

wherein a and d independently are an integer from 1 to 3 with a+d=3 or 4, b and c independently are an integer from 0 to 7 with b+c=2a+1, and e and f independently are an integer from 0 to 7 with e+f=2d+1, with further at least one of b and e being 1 or greater and at least one of c and f being 1 or greater.

It is thereby a preferred embodiment that in the general structure or formula (IV) of the hydrofluoro monoether: a is 1, b and c independently are an integer ranging from 0 to 3 with b+c=3, d=2, e and f independently are an integer ranging from 0 to 5 with b+c=5, with further at least one of b and e being 1 or greater and at least one of c and f being 1 or greater.

According to a particularly preferred embodiment, exactly one of c and f in the general structure (IV) is 0. The corresponding grouping of fluorines on one side of the ether linkage, with the other side remaining unsubstituted, is called "segregation". Segregation has been found to reduce the boiling point compared to unsegregated compounds of the same chain length. This feature is thus of particular interest for the dielectric insulation medium, because compounds with longer chain lengths allowing for higher dielectric strength can be used without risk of liquefaction under operational conditions.

Most preferably, the hydrofluoro monoether is selected from the group consisting of pentafluoro-ethyl-methyl ether ($CH_3$—O—$CF_2CF_3$) and 2,2,2-trifluoroethyl-trifluoromethyl ether ($CF_3$—O—$CH_2CF_3$).

Pentafluoro-ethyl-methyl ether has a boiling point of +5.25° C. and a GWP of 697 over 100 years, the F-rate being 0.625, while 2,2,2-trifluoroethyl-trifluoromethyl ether has a boiling point of +11° C. and a GWP of 487 over 100 years, the F-rate being 0.75. They both have an ODP of 0 and are thus environmentally fully acceptable.

In addition, pentafluoro-ethyl-methyl ether has been found to be thermally stable at a temperature of 175° C. for 30 days and therefore to be fully suitable for the operational conditions given in a converter building. Since thermal stability studies of hydrofluoro monoethers of higher molecular weight have shown that the stability of ethers containing fully hydrogenated methyl or ethyl groups have a lower thermal stability compared to those having partially hydrogenated groups, it can be assumed that the thermal stability of 2,2,2-trifluoroethyl-trifluoromethyl ether is even higher.

Hydrofluoro monoethers in general, and pentafluoro-ethyl-methyl ether as well as 2,2,2-trifluoroethyl-trifluoromethyl ether in particular, display a low risk for human toxicity. This can be concluded from the available results of mammalian HFC (hydrofluorocarbon) tests. Also, information available on commercial hydrofluoro monoethers give no evidence of carcinogenicity, mutagenicity, reproductive/developmental effect and other chronic effects of the compounds of the present application.

Based on the data available for commercial hydrofluoro ethers of higher molecular weight, it can be concluded that hydrofluoro monoethers in general, and in particular pentafluoro-ethyl-methyl ether as well as 2,2,2-trifluoroethyl-trifluoromethyl ether, have a lethal concentration LC 50 of higher than 10,000 ppm, rendering them suitable for use in a converter building also from a toxicological point of view.

The hydrofluoro monoether mentioned above have a higher dielectric strength than air. In particular, pentafluoro-ethyl-methyl ether has a dielectric strength about 2.4 times higher than air at 1 bar.

Given its boiling point, which is preferably below 30° C., the hydrofluoro monoether according to the present invention, particularly pentafluoro-ethyl-methyl ether and 2,2,2-trifluoroethyl-trifluoromethyl ether, respectively, is normally at least partially in the gaseous state at operational conditions of a convertor building.

As mentioned, the advantages achieved by the present invention are of particular relevance when the converter building is comprised in or is an HVDC station, an HVAC station or an HVAC/HVDC station. HVDC and HVAC stations as well as HVAC/HVDC station encompass both onshore and offshore stations. In particular, the present invention relates to an HVDC offshore station.

If in the insulation medium air and 1,1,1,2,4,4,5,5,5-nonafluoro-4-(trifluoromethyl)pentan-3-one as insulation component C1 is used, the fraction of the latter is at room temperature such that the dielectric performance of the insulation medium is comparable to that of $SF_6$. This allows a reduction of the insulation distances by a factor of up to about 3 to be achieved.

In a conventional Dolwin converter, the average air insulation distance is 2.5 m. By using an insulation medium comprising apart from air 1,1,1,2,4,4,5,5,5-nonafluoro-4-(trifluoromethyl)pentan-3-one a reduction down to about 0.8 m can thus be achieved.

According to a particularly preferred embodiment, the at least one room is selected from the group consisting of: a valve hall having valve hall walls, a valve hall opening and power semiconductor valves; a reactor hall having reactor hall walls, a reactor hall opening and a reactor; a DC hall having DC hall walls, a DC hall opening and DC electrical active parts, which may include power semiconductors; a GIS hall having GIS hall walls, a GIS hall opening and gas-insulated switchgears; a cable hall having cable hall walls, a cable hall opening and electrical cables; a transformer hall having transformer hall walls, a transformer hall opening and transformers; an arrestor hall having arrestor hall walls, an arrestor hall opening and arrestors.

According to a one embodiment, the valve hall is enclosed by the valve hall wall having the valve hall opening, said valve hall comprising at least a part of the power semiconductor valves, in particular IGBTs (insulated-gate bipolar transistors) and/or thyristors, as electrical active part, and the dielectric insulation medium comprising the dielectric insulation component C1. The valves may thereby be arranged in the form of valve stacks.

In a conventional Dolwin converter, the valve hall typically has a height of 9 m, a length of about 40 m and a depth of about 30 m, amounting to a total volume of 10,800 m³.

A reduction in height can be achieved by reducing the insulation distance between the top of the valve stacks and the ceiling as well as the insulation distance between the bottom of the valve stacks and the floor from 2.5 m to 0.8 m. Thus, an overall reduction of about 3.4 m down to about 5.6 m can be achieved.

In the valve hall, there are generally three groups of valve stacks, each belonging to a particular phase. In a conventional Dolwin converter, the distance between the outer valve stacks and the room wall is about 2.5 m, and the distance between the middle valve stack and the two outer valve stacks is in both cases about 6 m.

Using the exemplary insulation medium mentioned above comprising 1,1,1,2,4,4,5,5,5-nonafluoro-4-(trifluoromethyl)

pentan-3-one and air, a reduction of the insulation distance between the middle valve stack and the two outer valve stacks down to about 2 m can be achieved.

For reasons of maintenance, also the distance between the outer valve stacks and the room wall is reduced down to about 2 m, and in principle a further reduction of the insulation distance down to about 0.8 m could be achieved.

Thus, an overall reduction of the depth of the valve hall from about 30 m to about 21 m can be achieved.

Also, the length of the valve hall can be reduced from about 40 m to about 39 m.

Combining the above reduction in height, depth and length, a valve hall can be achieved having a total volume of only about 4,686 m$^3$. The total reduction per valve hall thus amounts to 6,214 m$^3$. Considering that there are two valve halls in the station, the total volume reduction amounts to 12,428 m$^3$. Also when the respective semiconductor values might be different from the ones mentioned, a considerable reduction of the valve hall volume is achieved in any case by using the insulation medium of the present invention.

It is understood that the valve hall itself can be subdivided into separate smaller compartments of which at least one or preferably all compartments comprise the dielectric insulation medium according to the present invention. Due to the compartments being smaller, the gas handling, the monitoring and the evacuation can be simplified, as also discussed below.

According to a further embodiment, the DC hall is enclosed by the DC hall wall, said DC hall comprising DC electrical active parts and the dielectric insulation medium comprising dielectric insulation component C1. In the context of the present invention, the term "converter building" is to be interpreted broadly such that it also encompasses the DC hall per se.

The DC electrical active parts contained in the DC hall contain preferably at least one electrically active part selected from the group consisting of: disconnectors, circuit breakers, switches and DC filters.

These are typically connected to the valve stacks via bushings through the room walls between the DC hall and the valve halls. Using the dielectric insulation medium according to the present invention, a substantial reduction of the insulation distances can also be achieved in the DC hall.

In a conventional Dolwin converter, the DC hall typically has a height of 9 m, a length of about 23 m and a depth of about 30 m, amounting to a total volume of 6,210 m$^3$. Reduction of the insulation distance from 2.5 m to about 0.8 m in the vertical direction and from 2.5 to about 2 m in the horizontal directions results in a total DC hall volume of 3,573 m$^3$, the total volume reduction being 2,637 m$^3$.

Alternatively, a reduction in the volume of the DC hall can be achieved by enclosing all electrical active parts in the DC hall inside two gas-insulated encapsulations (GIS), connected directly to the bushings from the two valve halls, respectively. Such gas-insulated substation may also contain the dielectric insulation medium of the present invention, in particular under pressure of more than 1 bar, and further in particular containing the dielectric insulation component C1 other than air in higher concentrations than as used in the above-mentioned sealable and preferably accessible rooms of the converter station.

As mentioned, the total volume of the converter building is in the order of several thousands of cubic meters, which illustrates that its size and hence the required insulation gas volume are by magnitudes higher than in a GIS encapsulation. Alike, the volume of at least some of the rooms is in the order of hundreds if not thousands of cubic meters.

Given the large size of the converter building, it is generally required for safety reasons that the internal pressure of each room does not or not significantly exceed atmospheric pressure, i.e. is at least approximately 1 bar. According to a preferred embodiment, the pressure of the insulation medium is at least approximately 1 bar at most, thus taking account of the respective safety requirements. Preferably, the pressure is such that it includes a slight overpressure, i.e. is slightly higher than 1 bar, in order to prevent humid air from entering the interior space, which could be the case, if the room walls had a leak.

According to a further embodiment of the present invention, the at least one opening gives access to an encapsulated electrically active part, in particular an encapsulated switchgear, and the dielectric insulation component C1 is other than sulphur hexafluoride $SF_6$, and in particular that the dielectric insulation medium comprises air or an air component.

As mentioned, the insulation medium comprising the insulation component C1 is non-toxic and may be present in concentrations such that maintenance personnel may enter the room. In particular, the concentrations may be chosen such that breathing without health risk is possible, e.g. by one of the steps selected from the group consisting of: evacuating the room before entering, flooding the room with air, compressed air, or the like before entering the room, ventilating the room to homogenize the concentration present in the room, choosing sufficiently low, in particular health-safe, concentrations under operating conditions, using a gas mask, and/or combinations thereof.

If concerns regarding the toxicity of the insulation medium exist, it is preferably removed from the interior space before the space is accessed. To this end, cooling means are preferably attributed to the at least one room for cooling its walls or interior space. In particular, these cooling means serve for enforced condensation of at least one dielectric compound C1 . . . Cn. Thus, the cooling means allow at least one insulation component C1 . . . Cn to be condensed, collected and removed from the interior space by a drainage system. Besides that, the cooling means may also allow to lower the operating temperature of the room without aiming at condensing the dielectric insulation component.

In summary, the cooling means can serve for different purposes, such as:
a) evacuating the interior space; and/or
b) recovering at least one dielectric insulation component C1 . . . Cn; and/or
c) setting a lower operating temperature of the room.

In particular when using a fluoroketone as insulation component C1, contact with water might lead to the formation of toxic and corrosive by-products, such as perfluoropropionic acid. In order to reduce the probability of water entering the interior space due to e.g. unintentional leakage, a non-aqueous cooling medium is preferably used in the cooling means.

In particular, the dielectric insulation component C1 itself is used as a cooling medium. In this regard, it is to be noted that the fluoroketones mentioned have apart from their dielectric insulation capabilities also excellent cooling capabilities. The cooling medium can thereby be a cooling liquid or a working medium in a heat pipe system. Such heat pipe system may be applied for cooling at least one of the rooms or at least one of the electrically active parts present in the rooms.

In an embodiment, the dielectric insulation medium is introduced into the interior space via injection means, such as nozzles.

In order to homogenously distribute the dielectric insulation medium, and in particular the at least one insulation component C1, C2, ... Cn in the interior space of the room, the room preferably comprises a fan.

When a fluoroketone or a hydrofluoro monoether is used as insulation component C1, the presence of water in the interior space can lead to the formation of toxic and corrosive by products, as mentioned above. According to a preferred embodiment of the present invention, circulating means are thus attributed to the room for circulating the dielectric insulation medium. Said circulating means may comprise means for purifying the insulation medium from impurities, in particular from water and/or products formed by the reaction of the insulation medium with water. These purification means can comprise or consist of a filter or a solid absorber for the respective substance. Although the formation of hydrofluoric acid (HF) is unlikely under normal operating conditions, it is also preferred that the purification means comprise an HF absorber.

For at least one insulation component C1, C2 ... Cn of the insulation medium, the converter building generally further comprises a filling reservoir for storing said dielectric insulation component. Preferably, the reservoir is connected to injection means for injecting the dielectric insulation component into the interior space of the room.

According to a particularly preferred embodiment, the converter building does not only comprise a reservoir for insulation component C1, but also a reservoir for the actual insulation medium, in particular insulation component C1 in mixture with air.

It is further preferred that the room comprises a drainage system for collecting and removing liquid substance contained in the interior space of the room. This is of particular relevance when insulation component C1 is to be removed, as may be the case for maintenance works. Preferably, the drain system comprises means for directing the liquid substance or a fraction thereof to a recollecting reservoir. Thus, regaining of at least a part of the insulation component can be achieved, which is advantageous from both an economic and ecological perspective.

It is further preferred that the converter building further comprises means for decomposing the insulation medium to an environmentally friendly substance. This is despite of the fact that the fluoroketones and hydrofluoro monoethers, that are preferably used, have no impact on the atmosphere, but takes into account that regeneration of the component from fluorinated waste (generated by the decomposition of the component due to e.g. arcing or exposure to sunlight) is relatively tedious to perform.

Preferably, the means for decomposing the insulation medium comprises a plasma waste treatment apparatus, as their installation requires only a relatively small space. Plasma waste treatment apparatuses are thus particularly suitable for use in offshore stations.

Since the dielectric strength of the insulation medium is strongly dependent on the fraction of insulation component C1 in the insulation medium, specifically on the ratio of e.g. the fluoroketone to air, the room preferably comprises monitoring means for monitoring a composition, a concentration, a humidity, a pressure, a density and/or a temperature of the insulation medium. By continuously tracking e.g. the partial pressure of the insulation component C1, possible leakage, condensation, reaction or decomposition can be detected in situ. It is further preferred that the converter building also comprises controlling means for controlling a composition, a concentration, a humidity, a pressure, a density and/or a temperature of the insulation medium.

According to a further preferred embodiment, the converter building comprises an intermediate gas storage room for temporarily storing the dielectric insulation medium. If a given room is to be evacuated temporarily, the dielectric insulation medium can be directed into the intermediate storage room, e.g. by a fast evacuation or removal pump, and may simply be redirected to the room for refilling, thus allowing a very simple and fast evacuation and refilling procedure.

According to a further aspect, the present invention further relates to a method for providing a converter building, comprising the consecutive steps of:

evacuating an interior space of at least one room of the converter building, drying the interior space, until a humidity below a predetermined humidity value is obtained, and introducing dry air and the dielectric insulation component C1 into the interior space of the room such that an insulation medium having a predetermined pressure is obtained.

To this end, the converter building comprises an evacuation and refill system which comprises a filling reservoir, e.g. for each of the insulation medium and the pure insulation component C1, as well as at least one compressor and vacuum pump system and a filter. After evacuation, the required amount of insulation component C1 is injected or sprayed from the filling reservoir into the interior space via e.g. a nozzle system installed e.g. on the ceiling of the respective room so that the required partial pressure of C1 is reached. Finally, the remainder of the insulation medium, generally dry air, is introduced up to the predetermined pressure, generally 1 bar.

The method of the present invention encompasses both an embodiment, in which the steps are taken using separate means for each room, or an embodiment using the same means for at least a portion of the rooms, in particular all rooms. The first mentioned embodiment is particularly preferred, if the volume of each of the respective rooms is relatively large.

BRIEF DESCRIPTION OF THE DRAWINGS

The invention is further illustrated by way of examples given in the attached Figures of which.

DETAILED DESCRIPTION OF THE INVENTION

Figure 1:
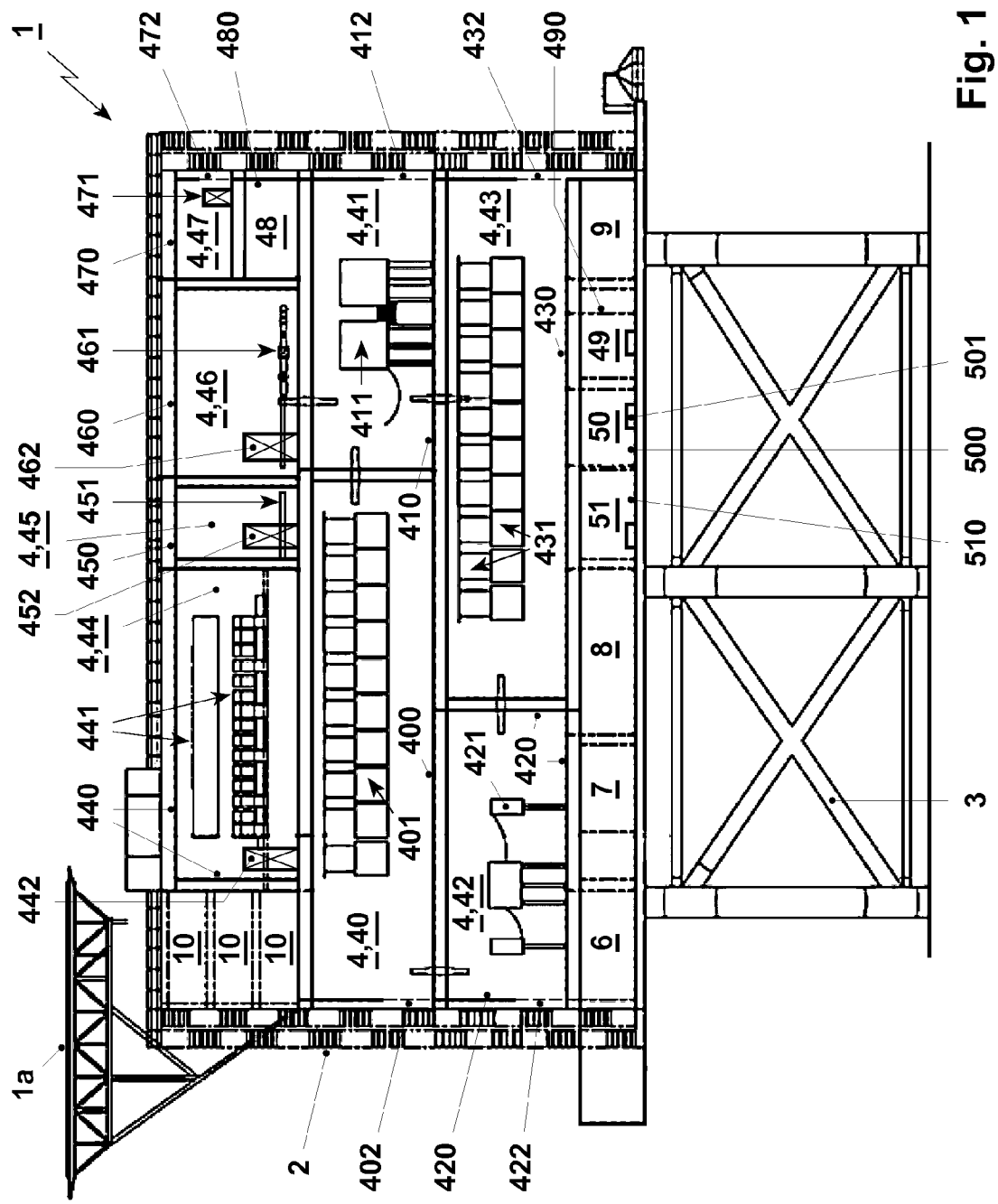
FIG. 1 shows an HVDC offshore station according to the present invention in cross-sectional view.

The HVDC offshore converter station shown in FIG. 1 corresponds to a conventional Dolwin converter station. It comprises a converter building 1 and a basement construction 3 on which the converter building 1 is arranged. The converter building 1 is spatially defined by a building wall 2 (e.g. with a staircase) which encloses a plurality of different rooms 4; 40-47, and may comprise further chambers or compartments 48-51.

Figure 3:
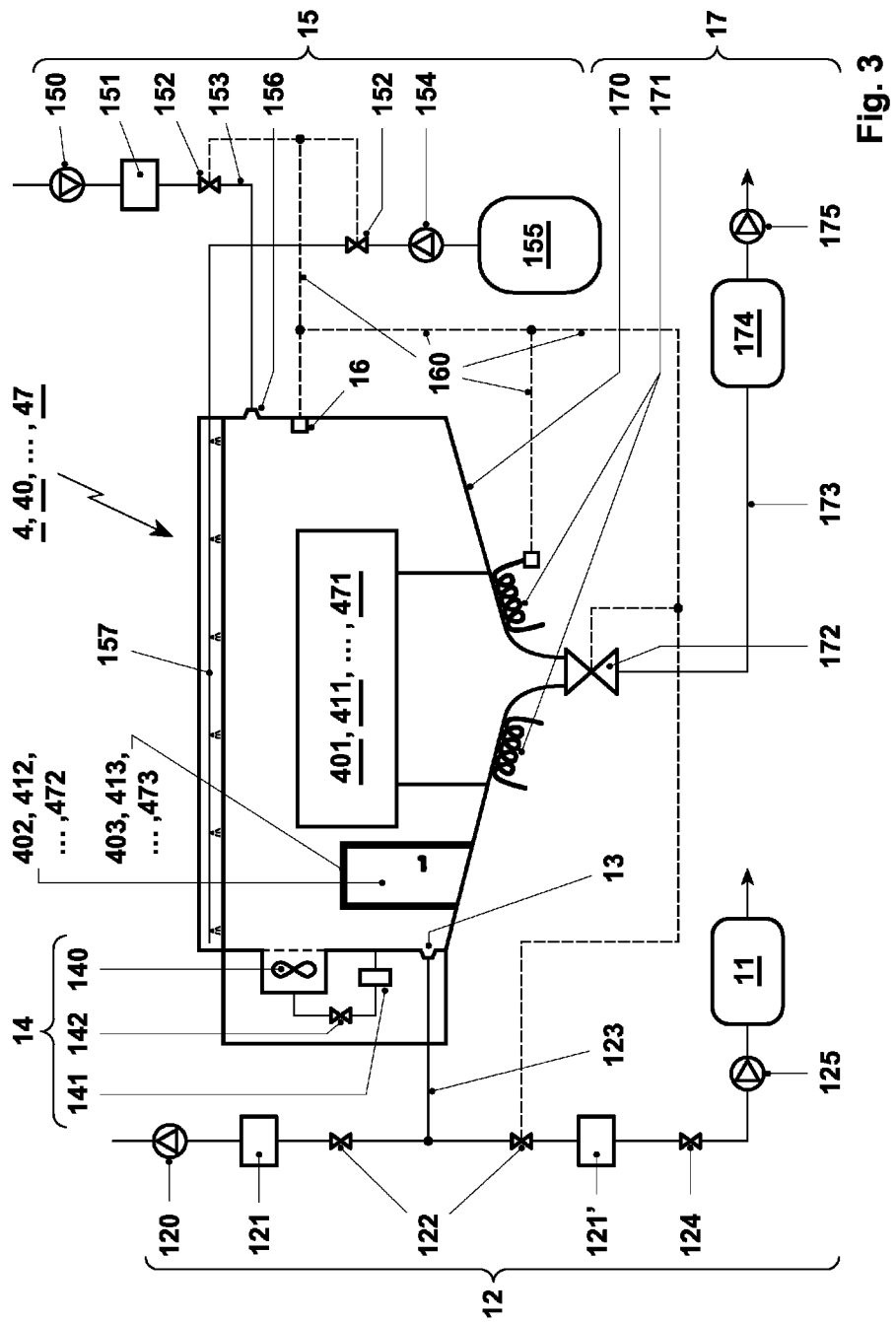
FIG. 3 shows a schematic representation of a room of a converter building according to the present invention.

Each of the rooms 4; 40-47 comprises a room wall 400, 410, 420, ... 470 enclosing an interior space and may also be designated as a "hall", which contain an electrical active part (401, 411, 421, ..., 471), as discussed below. The room walls 400, 410, 420, ... 470 are solid and have at least one opening, in particular door 402, 412, 422, 432; 442, 452, 462, 472, which is designed such that it allows a human to enter the interior space. The opening or openings or door or doors 402, 412, . . . , 472 is or are sealable such that the room walls 400, 410, . . . , 470 enclose their respective interior space in a gas-tight manner when its respective opening or openings 402, 412, . . . , 472 is or are sealed, and the interior space contains a dielectric insulation medium comprising a dielectric insulation component C1 other than air, as disclosed herein. The means for sealing can for example be a door sealing 403, 413, 423, 433, 443, 453, 463, 473, as shown in FIG. 3.

The rooms 4; 40-47 and further chambers or compartments 48-51 are arranged e.g. on four different floors. On the first or bottom floor, an electrical supply hall 51 containing electrical supplies and a low voltage switchgear hall 50 containing a low-voltage switchgear 501 are housed apart from a mechanical workshop 6, a sewage/sludge tank 7, fresh water pumps 8, a heating/ventilation/air-conditioning system 49 and a Diesel generator 9.

On the second floor and third floor, two valve halls 4, 40, 43, a DC hall 4, 42 and a reactor hall 4, 41 are housed. The DC hall 42 contains e.g. disconnectors and circuit breakers as DC electrical active parts 421, which are connected to the stacks of power semiconductor valves 401, 431 contained in the valve halls 40, 43, respectively, via bushings through the room walls 400, 420; 420, 430, respectively between the DC hall 42 and the valve halls 40, 43, respectively.

The valves 401 in the valve hall 40 on the third floor are further connected to the reactors 411 (i.e. coils forming large inductances) in the reactor hall 41 via bushings. Usually, the reactors 411 are coils without an iron core.

On the fourth or top floor, three living quarters 10 are arranged on top of each other, as well as a GIS hall 44 containing GIS switchgear 441, a cable hall 45 containing cables 451, a transformer hall 46 containing transformers 461, the latter also being connected to the reactor hall 41 via bushings. The fourth floor further houses an arrestor hall 47 containing arrestors 471. According to an embodiment of the invention, an inter-mediate gas storage room 48 for temporarily storing the dielectric insulation medium contained in another room can be present, as well.

By means of the valves or valve stacks 401, 431, AC is converted to DC. Correspondingly, the insulation distances between the stacks of valves 401, 431 and the valve hall walls 400, 430 are relatively big in order to allow safe operation. The valve hall of a conventional Dolwin converter thus has a valve hall of about 10,800 m$^3$.

According to the present invention, at least one room 4; 40-47 containing in its interior space an electrical active part 401, 411, . . . , 471 contains a dielectric insulation medium comprising a dielectric insulation component C1 other than air.

Figure 2:
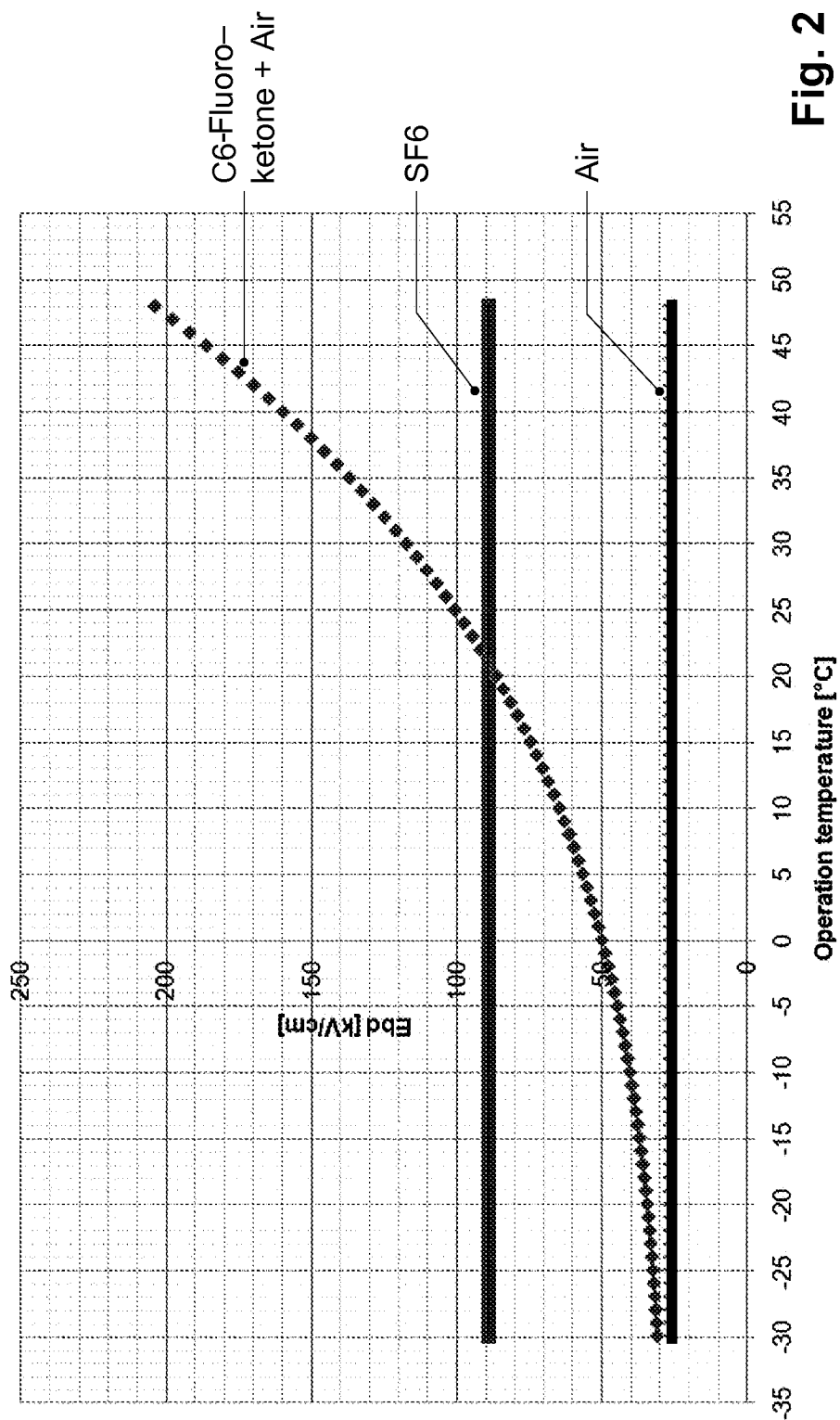
FIG. 2 is a graphical representation of the calculated electrical breakdown field as a function of the operating temperature for an insulation medium according to the present invention in comparison with air and $SF_6$.

For an insulation medium comprising apart from air 1,1,1, 2,4,4,5,5,5-nonafluoro-4-(trifluoromethyl)pentan-3-one ("C6-ketone") which is preferably used as insulation component C1, the calculated electrical breakdown field (Ebd) as a function of the operating temperature is shown in FIG. 2.

As can be seen from FIG. 2, the Ebd calculated for the insulation medium can be increased with increasing temperature due to the increasing partial pressure of insulation component C1 that may be present in the gaseous phase. At 0° C., the Ebd is about 2 to 2.5 times higher than that of pure synthetic air. Assuming a homogenous or nearly homogenous field distribution, this means that for a minimum operating temperature of 0° C., a reduction of the insulation distances by a factor of about 2.5 can be achieved by replacing synthetic air with the insulation medium according to the present invention.

At 20° C., the Ebd corresponds approximately to the one achieved with $SF_6$, which is about 3 times higher than that of pure synthetic air. For a minimum operating temperature of 20° C., a reduction of the insulation distances by a factor of about 3 can be achieved by replacing synthetic air with the insulation medium according to the present invention. Again, this applies for homogenous or nearly homogenous field distribution.

The method of the present invention can be illustrated by the exemplary embodiment shown in FIG. 3.

Prior to filling, the interior space of the room 4; 40-47 containing an electrical active part 401, 411, . . . , 471 and having walls 400, 410, . . . , 470 and a sealable opening—or door 402, 412, . . . , 472, in particular a door 402, 412, . . . , 472 with sealing means 403, 413, 423, 433, 443, 453, 463, 473—for a person to enter and/or leave the room is evacuated by using an evacuation system 12 comprising an evacuating pump 120, an evacuating filter system 121 and an evacuating mechanical valve 122, which are connected to an evacuating orifice 13 in the room wall 400 via the ducts of an evacuating pipe system 123. Optionally, the interior space can be dried and cleaned by filling with an inert gas, e.g. $N_2$, from a pressurized purging reservoir 11 via mechanical valve 122 using a filter system 121' located upstream of the valve 122 for removing residual water and other impurities from the inert gas.

The inert gas (or purge gas) filled interior space may then be evacuated again to the atmosphere by using evacuation system 12. The steps of filling with an inert gas and removing the inert gas can be repeated several times. During these steps, the humidity and the pressure in the interior space are measured and controlled using a multi-sensor system comprising monitoring means 16, which may include sensors e.g. for the concentration, the pressure, the temperature, the density and the humidity of the insulation medium, as well as communication lines 160 for transmitting the signals of the sensors, e.g. to a central station (not shown).

Once the desired humidity or dryness is achieved, dry and filtered synthetic air is introduced into the interior space, whereby the filter system 121' provides the required purity and humidity of the air.

If according to the multi-sensor system 16 there is still moisture in the interior space, the air can be circulated using circulation means 14 comprising a fan 140 and a mechanical valve 142 through which the air is directed to a filter 141 for purifying the air from residual water until the desired humidity is reached, and then reintroducing the filtered and dried air into the interior space. The filter 141 can be or can include a moisture filter and/or an HF filter.

Once the interior space of the room 4; 40-47 is at the desired humidity and pressure level, the insulation component C1 is injected by means of a filling system 15. Said filling system 15 comprises a filling reservoir 155 from which the insulation component C1 is pumped using a filling pump 154 through a filling pipe system 153 and via a filling mechanical valve 152 to the injection system 157, e.g. in the form of nozzles. The filling system 15 may further comprise a filling pump 150, filling filter system 151, filling mechanical valve 152 connected via a or the filling pipe system 153 to the filling orifice 156. These further elements 150-153 may allow to fill in air or general another dielectric insulation component C2, . . . , Cn other than the dielectric insulation component C1. Please note that these further elements may or may not be linked to the filling system providing the dielectric insulation component C1 from filling reservoir 155 such that the component C1 and other components C2, . . . , Cn are mixed together after being filled in and thus inside the room 4;

40-47, and/or may be mixed together before being filled in and thus outside the room 4; 40-47, e.g. in a mixture tank (not shown).

For homogenously distributing the insulation component C1 in the interior space, the room 4; 40-47 can comprises a fan system 14 that may comprise a fan 140, a circulation filter 141, e.g. moisture filter 141 and/or HF filter 141, and a mechanical valve 142.

During operation, the composition of the insulation medium as well as the pressure and the temperature in the interior space is monitored with the monitoring means 16 and, if needed, additional air or insulation components is injected into the interior space of the room 4; 40-47.

The temperature inside the interior space can be regulated by using a heating and cooling system 171.

If the interior space of the room 4; 40-47 needs to be accessed, e.g. for maintenance or in case of emergency, it may be that the insulation medium has to be removed. To this end, the temperature is decreased by using the cooling system 171.

If the temperature falls below a predetermined value, the insulation component C1 starts to liquefy, whereupon the condensate can be collected on the recollecting floor 170 and can be removed from the interior space. Alternatively, the gas can be flown through a condensation tank (not shown) which is located outside the room 4; 40-47 and can therein be liquefied and separated from the air. For the case that the insulation medium consists of air and a single insulation component C1, the condensate is separated from the room 4; 40-47 by a recollecting valve 172 and pumped via a recollecting duct 173 by means of a recollecting pump 175 to either a recollecting reservoir 174 or a disposal tank. It is thereby preferably filtered to remove dust particles from the insulation component C1.

For the case that the insulation medium comprises more than one insulation component C1, C2, ... Cn, the condensate is separated into its respective components by e.g. phase separation or distillation, and the separated components are then pumped into the respective reservoir or disposal tank, respectively.

After separation of the insulation components from the air, the air is pumped through a filter and released into the atmosphere, preferably via evacuation system 12, in particular via orifice 13, duct 123, valve 122, filter 121 and pump 120. The interior space can later be filled again as described above.

As discussed above, the concept of the present invention is most preferably used for the valve hall 4; 40, 43 and/or the DC hall 4; 42. In order to simplify gas handling, monitoring, evacuation and maintenance of the room 4; 40-47, in particular the valve hall 40, 43 and/or DC hall 42, the room 4; 40-47 can be subdivided into separate smaller compartments (not shown) which may be housing the electrically active parts 401-471. Thus, less efficient means for homogenously distributing the dielectric insulation medium of the present invention in the room 4; 40-47, in particular in the valve hall 40, 43 and/or DC hall 42, for monitoring, and, in view of accessing the room 4; 40-47 e.g. for maintenance, for condensing the insulation gas component C1 and for evacuating the room 4; 40-47 can be chosen than if it would be the case for such means that are required for one large room 4; 40-47 without separate smaller compartments.

In yet other words, the object of the invention is solved by a building 1, in particular a converter building 1 as disclosed above or according to the claims, the building 1 comprising at least one room 4; having a solid room wall 400, 410, 420, ..., 470 enclosing an interior space and at least one electrical active part 401, 411, 421, ..., 471 contained in said interior space, the room wall 400, 410, ..., 470 having at least one opening 402, 412 ..., 472, which is designed such that it allows a human to enter the interior space, wherein the opening 402, 412, ..., 472 is sealable, the room wall 400, 410, ..., 470 encloses the interior space in a gas-tight manner when the opening 402, 412, ..., 472 is sealed, and the interior space contains a dielectric insulation medium comprising a dielectric insulation component C1 other than air, wherein further the electrical active part comprises at least one non-encapsulated electrical active part that is operated under medium voltage and/or high voltage, and/or under heavy current. Such operation under medium voltage and/or high voltage, and/or under heavy current serves for electric power handling, in particular for electric power generation, transforming, transmission, distribution, and further in particular for electric power usage at medium and/or high voltage.

In embodiments, the electrical active part is selected from the group consisting of: a generator, a transformer, a circuit breaker, a dead tank breaker with bushings, a module or "PASS" module comprising electrical components housed in a dead tank and equipped with bushings, an instrument transformer, a disconnector, an earthing switch, a combined disconnector and earthing switch, a busbar, a surge arrester, a cable, a part of a substation, a substation, a part of an electrical distribution or transmission line; and wherein the electrical active part comprises at least one non-encapsulated electrical active part or component, in particular a bushing or conductor or bare cable or bare part, which non-encapsulated electrical active part or component requires during operation insulation by the dielectric insulation medium comprising or being a gas and having a dielectric insulation capability higher than the dielectric insulation capability of air, in particular of dry air. Herein, bare part can encompass a partially bare part, for example a part having at least one location that is without solid insulation or has a naked conductor. Bare part can also encompass an incompletely bare part, for example a part having at least one location that has a reduced solid insulation that requires in its environment a gas insulation with higher dielectric strength than that of air, in particular of ambient air or of dry air.

In particularly preferred embodiments, the room 4; 40-47 is filled with the dielectric insulation medium comprising or being a mixture of air with gaseous fluoroketone having exactly 6 carbon atoms, and the electrical active part 401, 411, 421, ..., 471 comprises a non-encapsulated electrical active part or electrical component insulated by the dielectric insulation inside the room 4; 40-47 and further comprises an encapsulated component, which is not exposed to the dielectric insulation medium and has in its encapsulation a gaseous insulation comprising or being a mixture of at least one of air, carbon dioxide and oxygen, in particular carbon dioxide and oxygen, with a gaseous fluoroketone having exactly 5 carbon atoms.

In another aspect, the invention resides in a method for operating or providing a building 1 as disclosed above or according to the claims, in particular for operating or providing a converter building 1 as disclosed above or according to the claims, wherein the non-encapsulated electrical active part 401, 411, 421, ..., 471 is maintained in operation, in particular is operated under medium voltage and/or high voltage and/or under heavy current, also during time intervals when the door 402, 412, 422, 432, 442, 452, 462, 472 is opened.

In embodiments, refilling means, in particular the injection means 157, attributed to the room 4; 40-47 are activated for refilling the room 4; 40-47 in regular time intervals, and/or by opening and/or closing the door, and/or in a controlled manner using monitoring means attributed to the room 4; 40-47, for example monitoring means 16, 160 for monitoring a composition, a concentration, a humidity, a pressure, a density and/or a temperature of the insulation medium inside the room 4; 40-47, and using controlling means attributed to the room 4; 40-47, in particular controlling means 12, 15 for controlling a composition, a concentration, a humidity, a pressure, a density and/or a temperature of the insulation medium inside the room 4; 40-47.

In embodiments, the refilling means are activated manually, in particular during every instance when the door has been opened, or semi-manually, wherein opening and/or closing the door activates the refilling means, in particular wherein the refilling means are arranged close to the at least one non-encapsulated electrical active part 401, 411, 421, . . . , 471.

The present invention has general advantages such as: electrical active parts suitable for handling electric power at medium and/or high voltage can be gas-insulated without being encapsulated in a metallic enclosure, such as typical GIS enclosures that are tight against substantial over-pressures (e.g. 1.2 bar or higher), can be designed and arranged with reduced dimensions compared to a pure air-insulation, and can be accessed by personnel without removal of the dielectric insulation medium or even during active electrical operation. This allows space savings, reduced building or room dimensions for housing the electrical active parts, or even new concepts of electric facilities or stations or substations with buildings or rooms that house electrical active parts with gas-insulation better, i.e. dielectrically stronger, than air-insulation, but without over-pressure or with only slight or insignificant over-pressure (e.g. less than 1.1 bar). Thus, previously air-insulated electric active parts can be reduced in size and mutual distances and/or previously GIS-insulated electrical active parts may be replaced.

While there are shown and described presently preferred embodiments of the invention, it is to be distinctly understood that the invention is not limited thereto but may otherwise variously be embodied and practised within the scope of the following claims. Therefore, terms like "preferred", "preferably", "in particular", "advantageously", etc. signify optional and exemplary embodiments only.

LIST OF REFERENCE NUMERALS 1 converter station, converter building
1a helicopter platform
2 building wall (e.g. with staircase)
3 basement construction
4; 40-7 room
40 valve hall
41 reactor hall
42 DC hall
43 valve hall
44 GIS hall
45 cable hall
46 transformer hall
47 arrestor hall
48 intermediate gas storage compartment
49 heating/ventilation/air-conditioning chamber
50 low-voltage switchgear chamber
51 electrical supply chamber
400, 410, 420, 430; 440, 450, 460, 470 wall of halls, room wall
480, 490, 500, 510 chamber wall, compartment wall
401, 411, 421, 431; 441, 451, 461, 471, electrically active part
401 power semiconductor valve(s)
411 reactor
421 DC electrical active part
431 power semiconductor valve(s)
441 GIS switchgear
451 cables
461 transformers
471 arrestors
501 low-voltage switchgear
402, 412, 422, 432; 442, 452, 462, 472 opening; opening for human being, door
403, 413, 423, 433; 443, 453, 463, 473 sealing means, door sealing
6 mechanical workshop
7 sewage room, sludge tank
8 fresh water pumps
9 Diesel generator chamber
10 living quarter
11 purging reservoir, pressurized reservoir
12 evacuation system, evacuating compressor and pump system
120 evacuating pump
121, 121' evacuating filter system
122 evacuating mechanical valve
123 evacuating pipe system
124 purging reservoir valve
125 purging reservoir pump
13 evacuating orifice
14 circulating means
140 fan
141 filter, circulation filter; moisture filter, HF filter
142 mechanical valve
15 filling system
150 filling pump (for air)
151 filling filter system
152 filling mechanical valve
153 filling pipe system
154 filling pump (for dielectric insulation component C1)
155 filling reservoir, reservoir for dielectric insulation medium, or reservoir for dielectric insulation component C1
156 filling orifice (for air)
157 injection system, spraying system, nozzles (for dielectric insulation component C1)
16 monitoring means; sensor, moisture detector; multi-sensor system; sensor for concentration, pressure, temperature, density, and/or humidity of gas mixture or gas components
160 communication lines, sensor and signal lines
17 recollecting means, recollecting system; drainage system
170 recollecting floor
171 cooling means; heating and cooling system
172 recollecting valve
173 recollecting duct
174 recollecting reservoir, recovery vessel
175 recollecting pump, fast removal pump

The invention claimed is:

1. A converter building comprising at least one room having a solid room wall enclosing an interior space and an electrical active part contained in said interior space, the room wall having at least one opening, which is designed such that it allows a human to enter the interior space, wherein the opening is sealable, the room wall encloses the interior space in a gas-tight manner when the opening is sealed, and the interior space contains a dielectric insulation medium comprising a dielectric insulation component C1 other than air.

2. The converter building according to claim 1, wherein the converter building is comprised in or is an HVDC station, an HVAC station or an HVAC/HVDC station, in particular an HVDC onshore or offshore station.

3. The converter building according to claim 1, wherein the dielectric insulation medium is present in concentrations of less than 10,000 ppm.

4. The converter building according to claim 1, wherein the dielectric insulation medium comprises air or an air component and the dielectric insulation component C1 is present in concentrations of less than 10,000 ppm.

5. The converter building according to claim 1, wherein the dielectric insulation medium, in particular the dielectric insulation component C1, is present in concentrations of less than 100,000 ppm.

6. The converter building according to claim 1, wherein a door is arranged at the at least one opening, the door being moveable, in particular pivotable or slidable, with respect to the opening from a first state, in which the opening is open, to a second state, in which the opening is closed, and vice versa, and in particular wherein the door is an air lock door or revolving door for reducing outflow of the dielectric insulation medium.

7. The converter building according to claim 6, wherein sealing means are attributed to the at least one opening for providing a gas-tight closure, and wherein the sealing means are arranged between a surface of the room wall in a region surrounding the at least one opening and a surface of the door.

8. The converter building according to claim 1, wherein the dielectric insulation component C1 is at least partially in gaseous phase at operational conditions.

9. The converter building according to claim 1, wherein the dielectric insulation component C1 has a higher dielectric strength than dry air or ambient air.

10. The converter building according to claim 1, wherein the dielectric insulation component C1 is an organofluorine compound.

11. The converter building according to claim 1, wherein the dielectric insulation component C1 is selected from the group consisting of: a fluoroketone, a hydrofluoro monoether, a perfluoroether, and mixtures thereof.

12. The converter building according to claim 11, wherein the fluoroketone contains from 4 to 12 carbon atoms.

13. The converter building according to claim 11, wherein the hydrofluoro monoether contains at least 3 carbon atoms.

14. The converter building according to claim 1, wherein the insulation medium comprises in addition to the dielectric insulation component C1 at least one further insulation component C2, . . . , Cn, said further insulation component C2, Cn being air or an air component, in particular being selected from the group consisting of: nitrogen, oxygen, carbon dioxide, noble gases, and mixtures thereof.

15. The converter building according to claim 1, wherein the insulation medium is devoid of sulphur hexafluoride $SF_6$, and in particular wherein the interior space of the room or of each room is devoid of $SF_6$.

16. The converter building according to claim 1, wherein the electrical active part is a medium voltage and/or high voltage and/or heavy current electrical active part, in particular is a high voltage electrical part above 72 kV.

17. The converter building according to claim 1, wherein at least one of the at least one electrical active part is non-encapsulated, in particular wherein the non-encapsulated electrical active part is in operation and requires during operation a dielectric gas insulation with a dielectric insulation capability higher than the dielectric insulation capability of air, in particular of dry air.

18. The converter building according to claim 1, wherein the at least one room is selected from the group consisting of: valve room having valve room walls, a valve room opening and power semiconductor valves; reactor room having reactor room walls, a reactor room opening and a reactor; DC room having DC room walls, a DC room opening and DC electrical active parts; GIS room having GIS room walls, a GIS room opening and gas-insulated switchgears; cable room having cable room walls, a cable room opening and electrical cables; transformer room having transformer room walls, a transformer room opening and transformers; arrestor room having arrestor room walls, an arrestor room opening and arrestors.

19. The converter building according to claim 18, wherein the valve room is enclosed by the valve room wall having the valve room opening, said valve room comprising at least a part of the power semiconductor valves, in particular IGBTs and/or thyristors, of the converter building as electrical active part, and the dielectric insulation medium being present in at least a part of the valve room and comprising the dielectric insulation component C1.

20. The converter building according to claim 19, wherein the valve room is subdivided into separate compartments, at least one of the compartments being gas-tight and its interior space containing the dielectric insulation medium comprising the dielectric insulation component C1.

21. The converter building according to claim 18, wherein the converter building is or contains a DC room which is enclosed by a DC room wall having the DC room opening and containing at least one DC electrical active part selected from the group consisting of: disconnectors, circuit breakers, switches, DC filters, and the dielectric insulation medium being present in at least a part of the DC room and comprising the dielectric insulation component C1.

22. The converter building according to claim 1, wherein the pressure of the insulation medium is at least approximately 1 bar and preferably includes a slight overpressure over 1 bar.

23. The converter building according to claim 1, wherein the at least one opening gives access to an encapsulated electrically active part, in particular an encapsulated switchgear, and the dielectric insulation component C1 is other than sulphur hexafluoride $SF_6$, and in particular that the dielectric insulation medium comprises air or an air component.

24. The converter building according to claim 1, wherein cooling means, in particular for enforced condensation of at least one of the dielectric components C1. . . Cn, are attributed to the at least one room for cooling its walls and/or interior space.

25. The converter building according to claim 24, wherein a non-aqueous cooling medium is used in the cooling means.

26. The converter building according to claim 25, wherein the dielectric insulation component C1 is used as the non-aqueous cooling medium, in particular as cooling liquid or as working medium in a heat pipe system.

27. The converter building according to claim 1, wherein the at least one room comprises a fan for homogenously distributing the dielectric insulation medium, in particular the at least one insulation component C1, C2, . . . Cn, in the interior space of the room.

28. The converter building according to claim 1, wherein circulating means are attributed to the room for circulating the dielectric insulation medium, said circulating means comprising means for purifying the insulation medium from impurities, in particular from water and/or products formed by the reaction of the insulation medium with water.

29. The converter building according to claim 1, wherein for at least one insulation component C1, C2, . . . Cn of the insulation medium the converter building further comprises a filling reservoir for storing said dielectric insulation component, in particular wherein the filling reservoir is connected to injection means for injecting the dielectric insulation component into the interior space of the room.

30. The converter building according to claim 1, wherein the room comprises a drainage system for collecting and removing liquid substance contained in the interior space of the room, said drainage system optionally comprising means for directing the liquid substance or a fraction thereof to a recollecting reservoir.

31. The converter building according to claim 1, wherein the converter building further comprises means for decomposing the insulation medium to an environment-friendly substance.

32. The converter building according to claim 1, wherein the room comprises monitoring means for monitoring a composition, a concentration, a humidity, a pressure, a density and/or a temperature of the insulation medium and controlling means for controlling a composition, a concentration, a humidity, a pressure, a density and/or a temperature of the insulation medium.

33. The converter building according to claim 1, wherein it further comprises an intermediate gas storage room for temporarily storing the dielectric insulation medium.

34. The converter building according to claim 1, wherein the converter building comprises or is or is comprised in a medium and/or high voltage substation comprising non-encapsulated gas-insulated electrical active parts.

35. A building comprising at least one room having a solid room wall enclosing an interior space and at least one electrical active part contained in said interior space, the room wall having at least one opening, which is designed such that it allows a human to enter the interior space, wherein the opening is sealable, the room wall encloses the interior space in a gas-tight manner when the opening is sealed, and the interior space contains a dielectric insulation medium comprising a dielectric insulation component C1 other than air, wherein further the electrical active part comprises at least one non-encapsulated electrical active part that is operated under medium voltage and/or high voltage.

36. The converter building according to claim 34, wherein the electrical active part is selected from the group consisting of: a generator, a transformer, a circuit breaker, a dead tank breaker with bushings, a PASS module comprising electrical components housed in a dead tank and equipped with bushings, an instrument transformer, a disconnector, an earthing switch, a combined disconnector and earthing switch, a busbar, a surge arrester, a cable, a part of a substation, a substation, a part of an electrical distribution or transmission line; and wherein the electrical active part comprises at least one non-encapsulated electrical active part, in particular bushing or conductor or bare cable or bare part, which non-encapsulated electrical active part requires during operation insulation by the dielectric insulation medium comprising or being a gas and having a dielectric insulation capability higher than the dielectric insulation capability of air, in particular of dry air.

37. The converter building according to claim 34, wherein the room is filled with the dielectric insulation medium comprising or being a mixture of air with gaseous fluoroketone having exactly 6 carbon atoms, and the electrical active part comprises a non-encapsulated electrical active part insulated by the dielectric insulation inside the room and further comprises an encapsulated component, which is not exposed to the dielectric insulation medium and has inside its encapsulation a gaseous insulation comprising or being a mixture of at least one of air, carbon dioxide and oxygen, in particular carbon dioxide and oxygen, with a gaseous fluoroketone having exactly 5 carbon atoms.

38. A method for operating a converter building according to claim 1, wherein the non-encapsulated electrical active part is maintained in operation, in particular is operated under medium voltage and/or high voltage and/or under heavy current, also during time intervals when the door is opened.

39. The method according to claim 38, wherein refilling means, in particular the injection means, attributed to the room are activated for refilling the room in regular time intervals, and/or by opening and/or closing the door, and/or in a controlled manner using monitoring means attributed to the room for monitoring a composition, a concentration, a humidity, a pressure, a density and/or a temperature of the insulation medium and using controlling means attributed to the room for controlling a composition, a concentration, a humidity, a pressure, a density and/or a temperature of the insulation medium inside the room.

40. The method according to claim 38, the refilling means being activated manually, in particular during every instance when the door has been opened, or semi-manually, wherein opening and/or closing the door activates the refilling means, in particular wherein the refilling means are arranged close to the at least one non-encapsulated electrical active part.

41. The method according to claim 38, the method comprising the consecutive steps of
evacuating an interior space of at least one room of the converter building,
drying the interior space, until a humidity below a predetermined humidity value is obtained, and
introducing dry air and the dielectric insulation component C1 into the interior space of the room such that an insulation medium having a predetermined pressure is obtained.

42. The method according to claim 41, wherein the steps are performed using separate means for each room or using the same means for at least a portion of the rooms, in particular for all rooms.

43. The converter building according to claim 11, wherein the fluoroketone contains 5 to 7 carbon atoms.

44. The converter building according to claim 11, wherein the fluoroketone contains exactly 5 carbon atoms or exactly 6 carbon atoms.

45. The converter building according to claim 11, wherein the hydrofluoro monoether contains exactly 3 carbon atoms or exactly 4 carbon atoms.

46. The converter building according to claim 11, wherein the fluoroketone contains exactly 5 carbon atoms or exactly 6 carbon atoms, wherein the hydrofluoro monoether contains exactly 3 carbon atoms or exactly 4 carbon atoms, and wherein the insulation medium comprises in addition to the dielectric insulation component C1 at least one further insulation component C2, . . . , Cn, said further insulation component C2, . . . , Cn being air or an air component, in particular being selected from the group consisting of: nitrogen, oxygen, carbon dioxide, noble gases, and mixtures thereof.

47. The converter building according to claim 46, wherein the at least one room is selected from the group consisting of: valve room having valve room walls, a valve room opening and power semiconductor valves; reactor room having reactor room walls, a reactor room opening and a reactor; DC room having DC room walls, a DC room opening and DC electrical active parts; GIS room having GIS room walls, a GIS room opening and gas-insulated switchgears; cable room having cable room walls, a cable room opening and electrical cables; transformer room having transformer room walls, a transformer room opening and transformers; arrestor room having arrestor room walls, an arrestor room opening and arrestors.

48. The building according to claims 35, wherein the electrical active part is selected from the group consisting of: a generator, a transformer, a circuit breaker, a dead tank breaker with bushings, a PASS module comprising electrical components housed in a dead tank and equipped with bushings, an instrument transformer, a disconnector, an earthing switch, a combined disconnector and earthing switch, a busbar, a surge arrester, a cable, a part of a substation, a substation, a part of an electrical distribution or transmission line; and wherein the electrical active part comprises at least one non-encapsulated electrical active part, in particular bushing or conductor or bare cable or bare part, which non-encapsulated electrical active part requires during operation insulation by the dielectric insulation medium comprising or being a gas and having a dielectric insulation capability higher than the dielectric insulation capability of air, in particular of dry air.

49. The building according to claim 35, wherein the room is filled with the dielectric insulation medium comprising or being a mixture of air with gaseous fluoroketone having exactly 6 carbon atoms, and the electrical active part comprises a non-encapsulated electrical active part insulated by the dielectric insulation inside the room and further comprises an encapsulated component, which is not exposed to the dielectric insulation medium and has inside its encapsulation a gaseous insulation comprising or being a mixture of at least one of air, carbon dioxide and oxygen, in particular carbon dioxide and oxygen, with a gaseous fluoroketone having exactly 5 carbon atoms.

50. A method for operating a building according to claim 35, wherein the non-encapsulated electrical active part is maintained in operation, in particular is operated under medium voltage and/or high voltage and/or under heavy current, also during time intervals when the door is opened.

51. The converter building according to claim 8, wherein the dielectric insulation medium and the dielectric insulation component C1 are gaseous at operational conditions.

* * * * *

UNITED STATES PATENT AND TRADEMARK OFFICE
CERTIFICATE OF CORRECTION

PATENT NO. : 9,172,221 B2  Page 1 of 1
APPLICATION NO. : 13/919494
DATED : October 27, 2015
INVENTOR(S) : Peter Terwiesch It is certified that error appears in the above-identified patent and that said Letters Patent is hereby corrected as shown below:

Title Page

Item 71 Applicants: replace "Ingold Mathias" with -- Mathias Ingold --.

Item 72 Inventors: replace "Ingold Mathias" with -- Mathias Ingold --.

Signed and Sealed this
Sixteenth Day of August, 2016

Michelle K. Lee
*Director of the United States Patent and Trademark Office*